United States Patent
Bhardwaj et al.

(10) Patent No.: US 10,517,003 B2
(45) Date of Patent: Dec. 24, 2019

(54) SYSTEMS AND METHODS FOR MAINTAINING SERVICE ON MULTIPLE SIMS IN A WIRELESS COMMUNICATION DEVICE OPERATING IN A MULTI-SIM MULTI-STANDBY (MSMS) MODE

(71) Applicant: QUALCOMM Incorporated, San Diego, CA (US)

(72) Inventors: Ashish Bhardwaj, Hyderabad (IN); Manjunatha Subbamma Ananda, Hyderabad (IN); Venkateswarlu Bandaru, Hyderabad (IN); Shakti Singh Chauhan, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 15/391,963

(22) Filed: Dec. 28, 2016

(65) Prior Publication Data
US 2018/0184309 A1 Jun. 28, 2018

(51) Int. Cl.
H04W 24/04 (2009.01)
H04W 24/08 (2009.01)
H04W 72/08 (2009.01)
H04W 72/04 (2009.01)
H04W 8/18 (2009.01)
H04W 88/06 (2009.01)

(52) U.S. Cl.
CPC .......... *H04W 24/04* (2013.01); *H04W 8/18* (2013.01); *H04W 24/08* (2013.01); *H04W 72/0453* (2013.01); *H04W 72/085* (2013.01); *H04W 88/06* (2013.01)

(58) Field of Classification Search
CPC .................................................... H04W 24/04
USPC .......................................................... 370/252
See application file for complete search history.

(56) References Cited

U.S. PATENT DOCUMENTS

| 9,504,055 | B1 | 11/2016 | Sanka et al. | |
| 2012/0250612 | A1* | 10/2012 | Jalloul | H04B 7/0805 370/328 |
| 2013/0329586 | A1* | 12/2013 | Mucke | H04W 24/02 370/252 |

(Continued)

OTHER PUBLICATIONS

International Search Report and Written Opinion—PCT/US2017/064874—ISA/EPO—dated Mar. 5, 2018.

*Primary Examiner* — Brandon M Renner
*Assistant Examiner* — Abdeltif Ajid
(74) *Attorney, Agent, or Firm* — The Marbury Law Group

(57) ABSTRACT

A wireless communication device having a first SIM and a second SIM and a radio frequency (RF) resource including multiple receive chains and at least one transmit chain may detect, during a connection to a first network associated with the first SIM, a start of a communication activity associated with the second SIM that uses one or more transmit chains and one or more of the receive chains. The wireless communication device may determine whether a carrier frequency of a cell serving the network associated with the first SIM is within a downlink frequency range supported by an unused receive chain of the RF resource. If not, the wireless communication device may identify a neighbor cell of the first network with a carrier frequency within a downlink frequency range supported by an unused receive chain of the RF resource, and attempt to camp the first SIM on that neighbor cell.

30 Claims, 9 Drawing Sheets

(56) References Cited

U.S. PATENT DOCUMENTS

| | | | |
|---|---|---|---|
| 2014/0213235 A1* | 7/2014 | Lou | H04B 15/04 |
| | | | 455/418 |
| 2015/0126187 A1* | 5/2015 | Ponukumati | H04W 72/02 |
| | | | 455/434 |
| 2015/0327103 A1* | 11/2015 | Tang | H04W 24/10 |
| | | | 370/252 |
| 2016/0345244 A1* | 11/2016 | Chuttani | H04W 48/16 |
| 2016/0365912 A1 | 12/2016 | Yang et al. | |
| 2016/0373948 A1 | 12/2016 | Sanka et al. | |
| 2017/0064762 A1* | 3/2017 | Ramasamy | H04W 76/18 |
| 2017/0180550 A1* | 6/2017 | Geo | H04M 3/4288 |

* cited by examiner

SYSTEMS AND METHODS FOR MAINTAINING SERVICE ON MULTIPLE SIMS IN A WIRELESS COMMUNICATION DEVICE OPERATING IN A MULTI-SIM MULTI-STANDBY (MSMS) MODE

BACKGROUND

Multi-subscriber identity module (SIM) wireless communication devices have become increasing popular because of the versatility that they provide, particularly in countries where there are many service providers. For example, dual-SIM wireless communication devices may allow a user to implement two different plans or service providers, with separate numbers and bills, on the same device (e.g., business account and personal account). Also, during travel, users can obtain local SIM cards and pay local call rates in the destination country. By using multiple SIMs, a user may take advantage of different pricing plans and save on mobile data usage.

In various types of multi-SIM wireless communication devices, each protocol stack associated with a subscription may store information provisioned by its respective network operator in a SIM, which may allow the SIM to support use of various different communication services. For example, various wireless networks may be configured to handle different types of data, use different communication modes, implement different radio access technologies, etc.

One type of multi-SIM wireless communication device, referred to as a multi-SIM multi-standby (MSMS) device, enables at least two SIMs to be in idle mode waiting to begin communications, and but only allows one SIM at a time to participate in an active communication due to sharing of a single radio frequency (RF) resource (e.g., transceiver). Some MSMS wireless communication devices may be configured with two SIMs, enabling multi-standby on both SIMs (i.e., dual-SIM dual-standby (DSDS) devices). Other MSMS wireless communication devices may extend this capability to more than two SIMs, and may be configured with any number of SIMs greater than two.

A DSDS device enables both SIMs to be in idle mode waiting to begin communications, but only allows one SIM at a time to participate in an active communication due to sharing of radio frequency (RF) resource(s) (e.g., transceiver(s)). Other multi-SIM devices may extend this capability to more than two SIMs, and may be configured with any number of SIMs greater than two (i.e., multi-SIM multi-standby wireless communication devices).

As such, using an active communication using one SIM, the wireless communication device may periodically tune away to a network associated with another SIM in idle mode (e.g., the second MI) to monitor signals (e.g., pages) or acquire a connection. In some MSMS devices, the RF resource is configured with multiple receive chains to allow receive diversity (e.g., multiple antennas and/or other front end RF components that receive copies of the same signal). Therefore, tune-aways to the network associated with a SIM may involve tuning away with one or multiple receive chains associated with the RF resource.

Therefore, communication activities on either SIM may directly impact another SIM's connection by extending service interruption. For example, the wireless communication device may lose service during an active communication on one SIM (e.g., a first SIM) based on an extended tune-away to the network associated with another SIM (e.g., a second SIM). Further, during an active communication on the second SIM, the wireless communication device remains in idle mode on the first SIM, and may not receive pages for mobile terminating calls if active communication on the second SIM has a high priority for radio access (e.g., a voice call).

SUMMARY

Systems, methods, and devices of various embodiments may enable improved performance of a wireless communication device having at least a first SIM and a second SIM associated with a radio frequency (RF) resource that includes multiple receive chains and at least one transmit chain. Various embodiments may include detecting, during a connection to a first network on a modem stack associated with the first SIM, a start of a communication activity on a modem stack associated with the second SIM that uses one or more transmit chains and one or more of the multiple receive chains of the RF resource, determining whether a carrier frequency of a cell serving the modem stack associated with the first SIM is within a downlink frequency range supported by an unused receive chain of the RF resource, and in response to determining that the carrier frequency of the cell serving for the modem stack associated with the first SIM is not within the downlink frequency range supported by an unused receive chain of the RF resource, identifying a neighbor cell of the first network that has a carrier frequency within a downlink frequency range supported by an unused receive chain of the RF resource, and attempting to camp the first SIM on the identified neighbor cell.

Some embodiments may further include identifying the one or more of the multiple receive chains used for the communication activity on the modem stack associated with the second SIM based on a radio access technology and current serving cell of the modem stack associated with the second SIM, identifying at least one unused receive chain of the RF resource, and identifying downlink frequencies supported by the at least one unused receive chain by accessing configurations stored on the wireless communication device. In some embodiments, identifying a neighbor cell of the first network that has a carrier frequency within a downlink frequency range supported by an unused receive chain of the RF resource may include accessing a neighbor cell database for the modem stack associated with the first SIM, and comparing neighbor cell carrier frequencies with the identified downlink frequencies supported by each unused receive chain.

Some embodiments may further include creating the neighbor cell database for the modem stack associated with the first SIM by identifying a set of neighbor cells for the modem stack associated with the first SIM based on system information received from the first network, periodically measuring signal properties on a downlink carrier frequency for each neighbor cell, and storing in the neighbor cell database information identifying each neighbor cell with corresponding recent signal measurements.

Some embodiments may further include identifying the one or more transmit chains used for the communication activity on the modem stack associated with the second SIM based on a radio access technology and current serving cell of the modem stack associated with the second SIM, identifying any unused transmit chains of the RF resource, identifying uplink frequencies supported by any unused transmit chains by accessing configurations stored on the wireless communication device, and using identified uplink frequencies to identify downlink frequencies supported by at least one unused receive chain.

In some embodiments, detecting the start of a communication activity on the modem stack associated with the second SIM may include detecting the start of a voice call on the modem stack associated with the second SIM. In some embodiments, detecting the start of a communication activity on the modem stack associated with the second SIM may include detecting the modem stack associated with the second SIM tuning to a second network supported by the second SIM for longer than a threshold time duration. In some embodiments, the connection to the first network on the modem stack associated with the first SIM may be an active data session.

Some embodiments may further include determining whether multiple neighbor cell carrier frequencies for the modem stack associated with the first SIM are within a downlink frequency range supported by an unused receive chain, and selecting, from among the multiple neighbor cell carrier frequencies, a target cell having a highest signal strength in response to determining that multiple neighbor cell carrier frequencies for the modem stack associated with the first SIM are within the downlink frequency range supported by the unused receive chain. In some embodiments, attempting to camp the first SIM on the identified neighbor cell may include attempting to camp the first SIM on the target cell. Some embodiments may further include determining whether attempting to camp the first SIM on the target cell was successful. Some embodiments may further include, in response to determining that attempting to camp the first SIM on the target cell was not successful, selecting, from among remaining neighbor cell carrier frequencies, a target cell having a next highest signal strength, and repeating attempting to camp the first SIM on the selected target cell. In some embodiments, the RF resource may include at least two sets of RF resource components. In some embodiments, each set of RF resource components may be configured to support a different range of uplink and downlink carrier frequencies, and each set of RF resource components may include at least one transmit chain and at least two receive chains configured to enable receive diversity.

Various embodiments include a wireless communication device configured to use at least a first SIM and a second SIM associated with an RF resource, and including a processor configured with processor-executable instructions to perform operations of the methods summarized above. Various embodiments also include a non-transitory processor-readable medium on which is stored processor-executable instructions configured to cause a processor of a wireless communication device to perform operations of the methods summarized above. Various embodiments also include a wireless communication device having means for performing functions of the methods summarized above.

BRIEF DESCRIPTION OF THE DRAWINGS

The accompanying drawings, which are incorporated herein and constitute part of this specification, illustrate exemplary embodiments of the claims, and together with the general description and the detailed description given herein, serve to explain the features of the claims.

DETAILED DESCRIPTION

Figure 1A:
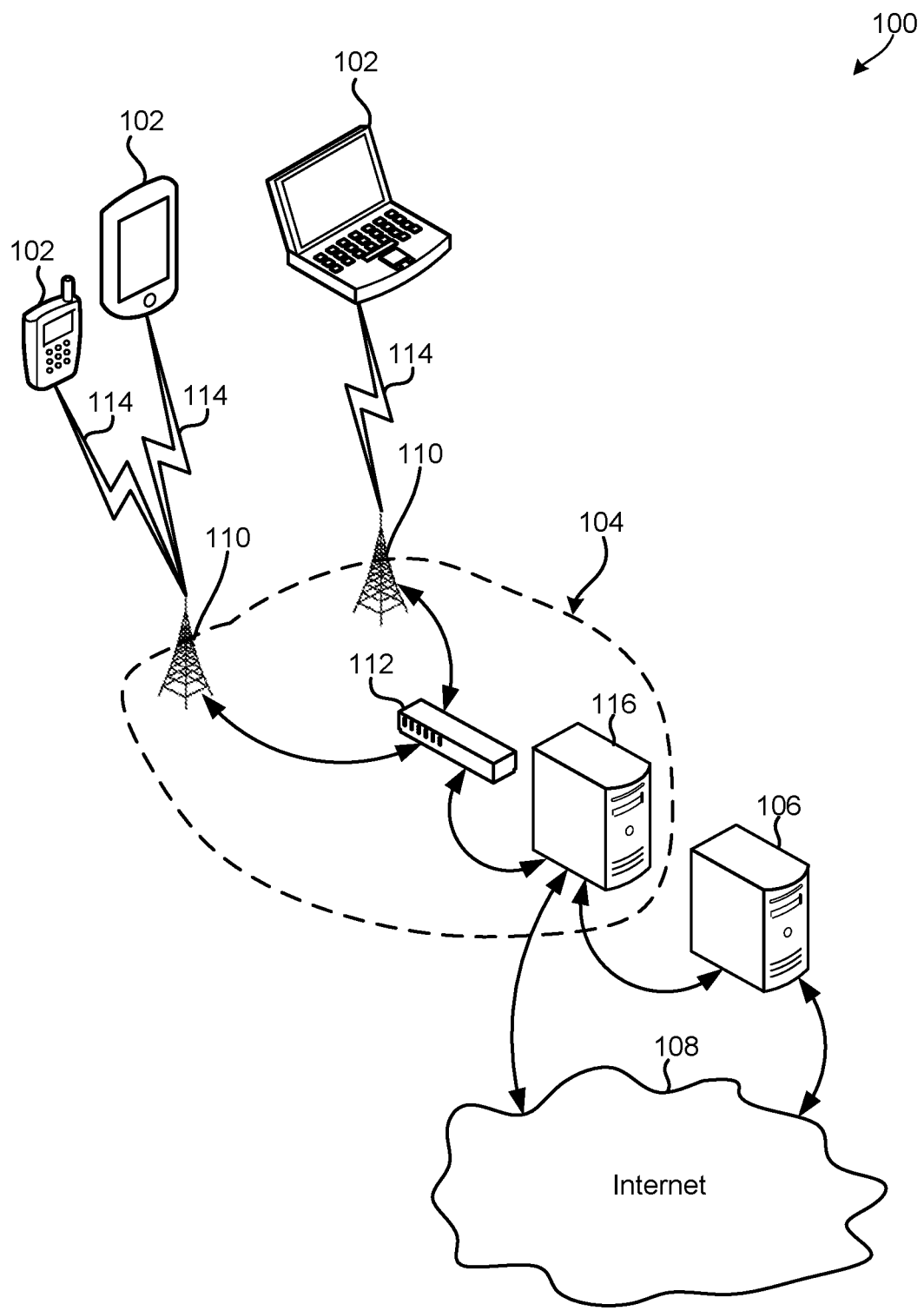
FIG. 1A is a communication system block diagram of a network suitable for use with various embodiments.

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the claims.

Various embodiments provide methods for maintaining network connections of a first subscription on a multi-SIM wireless communication device under circumstances in which a second subscription performs a prolonged tune-away or voice call.

Modern wireless communication devices may include a plurality of SIM cards that enable a user to connect to different mobile networks while using the same mobile communication device. Each SIM card serves to identify and authenticate a subscriber using a particular mobile communication device, and each SIM card is associated with only one subscription. For example, a SIM card may be associated with a subscription to one of a GSM, TD-SCDMA, CDMA2000, and/or Wideband Code Division Multiple Access (WCDMA) system. Further, multi-SIM operations may be applicable to any of a number of wireless communication system, using various multiple access schemes, such as, but not limited to, Code Division Multiple Access (CDMA), Frequency Division Multiple Access (FDMA), Orthogonal Frequency Division Multiple Access (OFDMA), or Time Division-Multiple Access (TDMA).

Normal RF resource arbitration may be employed to schedule use of one or more shared RF resources between SIMs on a MSMS wireless communication device. While such sharing may be limited to transmit and/or receive functions, in some MSMS wireless communication devices the sharing may extend to functions associated with a baseband-modem processor. Examples of baseband-modem processor functions that may be shared depend on the particular access technology, but can include downlink/uplink common channel processing, downlink/uplink common signal processing, receive/transmit signal processing, etc.

In an MSMS device in which at least one SIM supports LTE, a shared RF resource may include one transmit chain and two receive chains. The two receive chains may provide diversity reception, enabling spatial multiplexing in a multiple input multiple output (MIMO) system to improve reliability of the wireless communication links.

If the baseband-modem processor supports carrier aggregation between the component carriers within different operating frequency bands, the wireless communication device may have two sets of RF resource components (i.e., four receive chains and two transmit chains) to support transceiver activities on two frequencies. Such RF resource components may be provided as separate RF resources, or may be provided as a single RF resource. For each RF resource component, the transmit chain, as well as the set of receive chains, may be configured to support either low frequency or high frequency bands. For example, a first set of receive chains (i.e., of a first RF resource component) may be configured to receive signals on 0-2000 MHz, while the second set of receive chains (i.e., of a second RF resource component) may be configured to receive signals on frequencies above 2000 MHz.

In an MSMS device in which one or more shared RF resources are used for an active communication (e.g., a data session) on a first SIM, a second SIM may be in an idle mode and not actively contending for access to the RF resource. The MSMS device may maintain a connection with a serving network associated with the second SIM by performing limited communication activities (i.e., "idle mode tasks"). Depending on the communication protocol, examples of idle mode tasks may include receiving system information, decoding a paging channel, measuring signal strength of neighbor cells, etc. Performing idle mode tasks for the second SIM during an active communication on the first SIM may involve implementing discontinuous reception (DRX) on the second SIM. In an "awake" period of the DRX cycle, the shared RF resource may tune away from the communication on the first SIM and tune to the network supporting the subscription enabled by the second SIM to perform idle mode activities, followed by tuning back to the communication on the first SIM Some idle mode tasks may result in a long tune-away to the network associated with the second SIM (e.g., longer than five seconds), and may therefore cause interruption of the active communication on the first SIM. For example, if the mobile communication device receives a paging message for a mobile terminating call on the second SIM, the wireless communication device may tune to the second network for longer than five seconds in order to receive the call. Further, the start of active communications on the second SIM (e.g., a mobile terminating call or mobile originating call) may force the first SIM to transition to or remain in idle mode, ending any ongoing data communications, and blocking receiving mobile terminating calls, on the first SIM.

Various embodiments provide methods for maintaining full service for a first SIM of a wireless communication device during a long tune-away or active voice call associated with a second SIM. In particular, various embodiments may utilize information about the receive chains being used to support the communication for the second SIM to identify available receive chains, and determine the frequency ranges that may be supported by the available receive chains. In various embodiments, the wireless communication device may access a neighbor cell database maintained on the device, which includes carrier frequencies obtained from system information and corresponding signal strength measurements. Based on the database, the wireless communication device may identify any carrier frequencies that are within the ranges supported by available receive chains, and select one such frequency as a target cell on which to perform system acquisition and camping. Therefore, the wireless communication device may cause a first SIM to preferentially connect to networks that are compatible with available RF resource(s) in order to enable simultaneous communication capability. In this manner, the wireless communication device may operate in a multi-SIM multi-active mode without requiring additional hardware.

Various embodiments may also extend to Long Term Evolution (LTE) wireless communication systems, thereby extending receive mode control operations to opportunistic multiple-input multiple-output (MIMO). Various embodiments may be used in any wireless communication device having two or more antennas and/or RF receive chain components that are part of or coupled to a shared RF resource.

The term "wireless communication device" is used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways enabled by two or more SIMs.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless communication device on a network and enable a communication service with the network. Because the information stored in a SIM enables the wireless communication device to establish a communication link for a particular communication service or services with a particular network, the term "SIM" is also be used herein as a shorthand reference to the communication service associated with and enabled by the information stored in a particular SIM as the SIM and the communication network, as well as the services and subscriptions supported by that network, correlate to one another. Similarly, the term SIM may also be used as a shorthand reference to the protocol stack and/or protocol stack and communication processes used in establishing and conducting communication services with subscriptions and networks enabled by the information stored in a particular SIM. For example, references to assigning an RF resource to a SIM (or granting a SIM radio access) means that the RF resource has been allocated to establishing or using a communication service with a particular network that is enabled by the information stored in that SIM.

As used herein, the terms "wireless network," "cellular network," and "cellular wireless communication network" are used interchangeably to refer to a portion or all of a wireless network of a carrier associated with a wireless communication device and/or subscription on a wireless communication device.

As used herein, the terms "diversity," "receive diversity," "diversity reception," and "receiver diversity" are used interchangeably to refer to processing a downlink/forward link signal by input to multiple receive chains in a wireless communications device. For example, at least two antennas provide at least two different inputs signals to a receiver, each of which has a different multi-path.

As used herein, the terms "subscription," "SIM," "SIM card," and "subscriber identification module" are used interchangeably to mean a memory that may be an integrated circuit or embedded into a removable card, which stores an International Mobile Subscriber Identity (IMSI), related key, and/or other information used to identify and/or authenticate a wireless communication device on a network. Examples of SIMs include the Universal Subscriber Identity Module (USIM) provided for in the LTE 3GPP standard, and the Removable User Identity Module (R-UIM) provided for in the 3GPP2 standard. Universal Integrated Circuit Card (UICC) is another term for SIM.

The terms subscription and SIM may also be used as shorthand reference to a communication network associated with a particular SIM, since the information stored in a SIM enables the wireless communication device to establish a communication link with a particular network, thus the SIM and the communication network, as well as the services and subscriptions supported by that network, correlate to one another.

As used herein, the terms "multi-SIM multi-standby communication device" and "MSMS communication device" are used interchangeably to describe a wireless communication device that is configured with more than one SIM and allows idle-mode operations to be performed on two networks simultaneously, as well as selective communication on one network while performing idle-mode operations on at least one other network.

As used herein, the term "RF resource" refers to the components in a wireless communication device that send, receive, and decode radio frequency signals. An RF resource typically includes a number of components coupled together that transmit RF signals that are referred to as a "transmit chain," and a number of components coupled together that receive and process RF signals that are referred to herein as a "receive chain" or "RF receive chain."

While specific embodiments may be described herein with reference to a degree of multi-access/multi-standby of two (i.e., two SIMs and protocol stacks) and a degree of diversity of two for a particular SIM (i.e., two antennas, two RF receive chains, etc.), such references are used as example and are not meant to preclude embodiments using three or more RF receive chains to provide receive diversity. The terms "receive chain" are used interchangeably herein, and may include various physical and/or logical components of the RF resource for use in receive operations, whether or not receive diversity is used at the time. Such portions of the RF resource may include, without limitation, an RF front end, and components of the RF front end (including a receiver unit). In the various embodiments, a receive chain may also include at least one antenna. Portions of the receive chain may be integrated into a single chip, or distributed over multiple chips. Also, the receive chain, or portions of the receiver chain may be integrated into a chip along with other functions of the wireless communication device. The embodiments described herein may be used in wireless systems having two or more antennas coupled to at least one receive component.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UNITS, which is the successor to Global System for Mobile Communications (GSM) technologies, currently supports various air interface standards, such as WCDMA, Time Division-Code Division Multiple Access (TD-CDMA), and Time Division-Synchronous Code Division Multiple Access (TD-SCDMA). The UNITS also supports enhanced 3G data communications protocols, such as High Speed Packet Access (HSPA), which provides higher data transfer speeds and capacity to associated UMTS networks.

In some wireless networks, a wireless communication device may have multiple subscriptions to one or more networks (e.g., by employing multiple subscriber identity module (SIM) cards or otherwise). Such a wireless communication device may include, but is not limited to, a multi-SIM multi-standby (MSMS) communication device (e.g., a dual-SIM dual-standby (DSDS) communication device). For example, a first subscription may be a first technology standard, such as WCDMA, while a second subscription may support the same technology standard or a second technology standard, such as Global System for Mobile Communications (GSM) Enhanced Data rates for GSM Evolution (EDGE) (also referred to as GERAN).

A multi-SIM wireless communication device that supports two or more SIMs may have a number of capabilities that provide convenience to a user, such as allowing different wireless carriers, plans, telephone numbers, billing accounts, etc. on one device. Developments in multi-SIM wireless communication device technology have led to a variety of different options for such devices. For example, an "active multi-SIM" wireless communication device allows at least two SIMs to remain active and accessible to the device. In particular, a type of active multi-SIM wireless communication device may be a MSMS wireless communication device in which at least two SIMs are configured to share one or more transceivers (i.e., RF resource(s)).

In various embodiments, the RF resources of a MSMS device may be configured to be shared between a plurality of SIMs, but may be employed by default to perform communications on a network enabled by a first SIM, such as a network capable of high-speed data communications (e.g., LTE, WCDMA, HSDPA, LTE, etc.).

Various embodiments may be implemented within many different communication systems, such as the example communication system 100 illustrated in FIG. 1A. The communication system 100 may include one or more wireless communication devices 102, a wireless communication network 104, and network servers 106 coupled to the wireless communication network 104 and to the Internet 108. In some embodiments, the network server 106 may be implemented as a server within the network infrastructure of the wireless communication network 104.

A typical wireless communication network 104 may include a plurality of cell base stations 110 coupled to a network operations center 112, which operates to connect voice and data calls between the wireless communication devices 102 (e.g., tablets, laptops, cellular phones, etc.) and other network destinations, such as via telephone land lines (e.g., a POTS (plain old telephone system) network, not shown) and the Internet 108. The wireless communication network 104 may also include one or more servers 116 coupled to or within the network operations center 112 that provide a connection to the Internet 108 and/or to the network servers 106. Communications between the wireless communication devices 102 and the wireless communication network 104 may be accomplished via two-way wireless communication links 114, such as GSM, UMTS, EDGE, fourth generation (4G), 3G, CDMA, TDMA, LTE, and/or other communication technologies.

In general, any number of wireless networks may be deployed in a given geographic area. Each wireless network may support one or more radio access technologies, which may operate on one or more frequency bands (also referred to as a carrier, channel, frequency channel, etc.) in the given geographic area in order to avoid interference between wireless networks of different radio access technologies.

Upon power up, the wireless communication device 102 may search for wireless networks from which the wireless communication device 102 can receive communication service. In various embodiments, the wireless communication device 102 may be configured to prefer LTE networks when available by defining a priority list in which LTE frequencies occupy the highest spots. The wireless communication device 102 may perform registration processes on one of the identified networks (referred to as the serving network), and the wireless communication device 102 may operate in a connected mode to actively communicate with the serving network.

Alternatively, the wireless communication device 102 may operate in an idle mode and camp on the serving network if an active communications session is not in progress on the wireless communication device 102. In the idle mode, the wireless communication device 102 may identify all radio access technologies (RATs) in which the wireless communication device 102 is able to find a "suitable" cell in a normal scenario or an "acceptable" cell in an emergency scenario, as specified in the LTE standards, such as 3GPP Technical Specification (TS) 36.304 version 8.2.0 Release 8, entitled "LTE; Evolved Universal Terrestrial Radio Access (E-UTRA); User Equipment (UE) procedures in idle mode" (May 2008), the details of which are incorporated by reference herein.

Figure 1B:
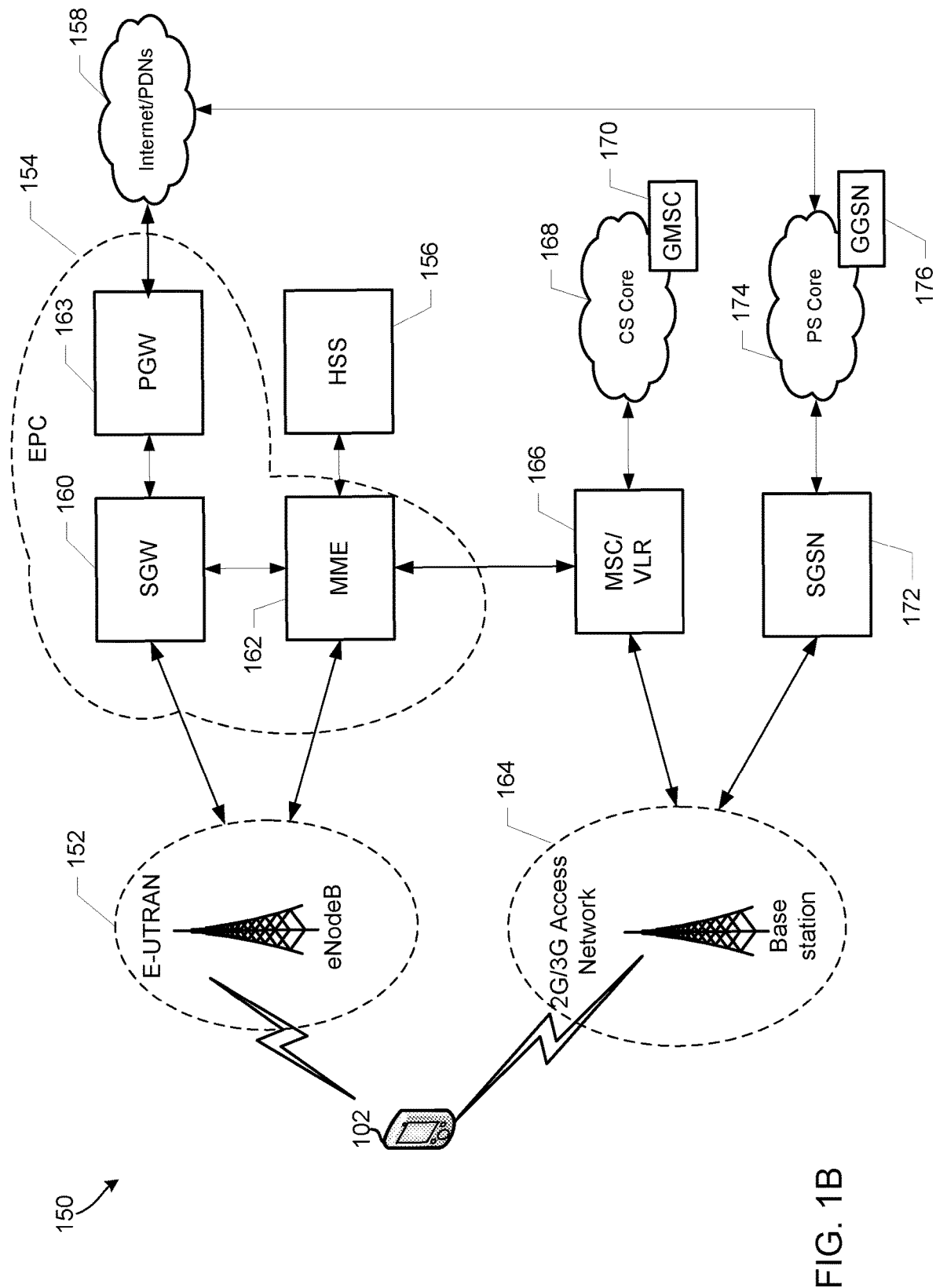
FIG. 1B is system block diagram of a network architecture suitable for use with the various embodiments.

FIG. 1B illustrates a network architecture 150 that includes an Evolved Packet System (EPS). With reference to FIGS. 1A-1B, in the network architecture 150 the wireless communication device 102 may be connected to an LTE access network, for example, an Evolved UMTS Terrestrial Radio Access Network (E-UTRAN) 152. In the various embodiments, the E-UTRAN 152 may be a network of LTE base stations (i.e., eNodeBs) (e.g., 110 in FIG. 1A), which may be connected to one another via an X2 interface (e.g., backhaul) (not shown).

Each eNodeB in the E-UTRAN 152 may provide an access point to an LTE core network, such as an Evolved Packet Core (EPC) 154. The EPC 154 may include at least one Mobility Management Entity (MME) 162, a Serving Gateway (SGW) 160, and a Packet Data Network (PDN) Gateway (PGW) 163. The E-UTRAN 152 may connect to the EPC 154 by connecting to the SGW 160 and to the MME 162 within the EPC 154. The MME 162, which may also be logically connected to SGW 160, may handle tracking and paging of the wireless communication device 102 and security for E-UTRAN access on the EPC 154. The MME 162 may be linked to a Home Subscriber Server (HSS) 156, which may support a database containing user subscription, profile, and authentication information. Further, the MME 162 provides bearer and connection management for user internet protocol (IP) packets, which are transferred through the SGW 160.

The SGW 160 may route incoming and outgoing IP packets for the wireless communication device 102 via the LTE access network and external IP networks (i.e., PDNs). The SGW 160 may also provide an anchor point for handover between eNodeBs. The SGW 160 may be logically connected to a PDN Gateway (PGW) 163, which may route packets to and from PDNs to form a connection between the EPC and various PDNs. The PGW 163 may be logically connected to a Policy Charging and Rules Function (PCRF), a software component that may enforce minimum quality of service parameters, and manage and control data sessions.

The PGW 163 may also provide connections with other public or private networks (e.g., the Internet, etc.).

The network architecture 150 may include circuit-switched (CS) networks and additional packet-switched (PS) networks. A wireless communication device 102 may be connected to the CS and/or PS packet switched networks by connecting to a legacy second generation (2G)/third generation (3G) access network 164. The 2G/3G access network 164 may be, for example, one or more of UTRAN, GERAN, CDMA2000 1× radio transmission technology (1×RTT), CDMA2000 Evolution Data Optimized (EV-DO), etc. The 2G/3G access network 164 may include a network of base stations (e.g., base transceiver stations (BTSs), nodeBs, radio base stations (RBSs), etc.) (e.g., 110), as well as at least one base station controller (BSC) or radio network controller (RNC). The 2G/3G access network 164 may connect to the circuit switched network via an interface with (or gateway to) a Mobile switching center (MSC) and associated Visitor location register (VLR), which may be implemented together as MSC/VLR 166. In the CS network, the MSC/VLR 166 may connect to a CS core 168, which may be connected to external networks (e.g., the public switched telephone network (PSTN)) through a Gateway MSC (GMSC) 170.

The 2G/3G access network 164 may connect to the PS network via an interface with (or gateway to) a Serving GPRS support node (SGSN) 172, which may connect to a PS core 174. In the PS network, the PS core 174 may be connected to external PS networks, such as the Internet and the Operator's IP services 158 through a Gateway GPRS support node (GGSN) 176.

Modulation and radio access schemes may be employed by a high-speed access network (e.g., an E-UTRAN), and may vary depending on the particular telecommunications standard being deployed. For example, in LTE applications, orthogonal frequency-division multiplexing (OFDM) may be used on the downlink, while single-carrier frequency-division multiple access (SC-FDMA) may be used on the uplink to support both frequency division duplexing (FDD) and time division duplexing (TDD).

Access network entities (e.g., eNodeBs) may have multiple antennas supporting MIMO technology, thereby enabling the eNodeBs to exploit the spatial domain to support spatial multiplexing, beamforming, and/or transmit diversity. Spatial multiplexing may be used to transmit different streams of data simultaneously on the same frequency. In some embodiments, the data steams may be transmitted to a single wireless communication device to increase the data rate, while in other instances the data streams may be transmitted to multiple wireless communication devices to increase the overall system capacity.

While the various embodiments may be described with reference to accessing LTE, various embodiments but may be extended to other telecommunication standards employing other modulation and multiple access techniques. By way of example, the various embodiments may be extended to EV-DO and/or Ultra Mobile Broadband (UMB), each of which are air interface standards promulgated by the 3rd Generation Partnership Project 2 (3GPP2) as part of the CDMA2000 family to provide broadband Internet access to wireless communication devices. The various embodiments may also be extended to IEEE 802.11 (Wi-Fi), IEEE 802.16 (WiMAX), IEEE 802.20, and/or Flash-OFDM employing OFDMA. The actual wireless communication standard and the access technology employed may depend on the specific application and the overall design constraints imposed on the system.

Figure 2:
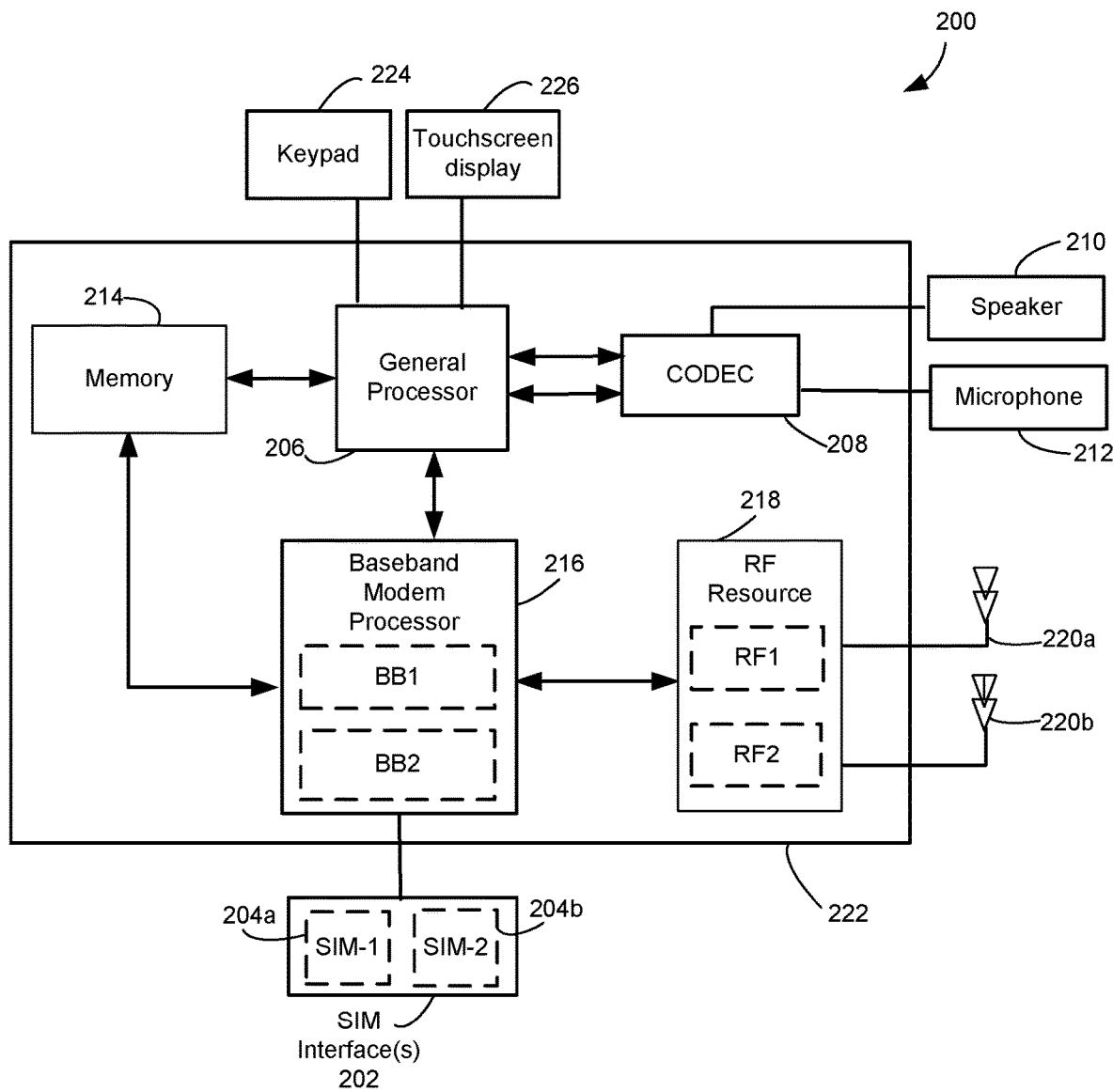
FIG. 2 is a block diagram illustrating a wireless communication device according to various embodiments.

FIG. 2 is a functional block diagram of an example wireless communication device 200 that is suitable for implementing various embodiments. According to various embodiments, the wireless communication device 200 may be similar to one or more of the wireless communication devices 102 described with reference to FIG. 1. With reference to FIGS. 1-2, in various embodiments, the wireless communication device 200 may be a single-SIM device, or a multi-SIM device, such as a dual-SIM device. In an example, the wireless communication device 200 may be a dual-SIM dual-active (DSDA) device or a dual-SIM dual-standby (DSDS) device. The wireless communication device 200 may include at least one SIM interface 202, which may receive a first SIM (SIM-1) 204a that is associated with a first subscription. In some embodiments, the at least one SIM interface 202 may be implemented as multiple SIM interfaces 202, which may receive at least a second SIM (SIM-2) 204b that is associated with at least a second subscription.

A SIM in various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM 204a, 204b may have a CPU, ROM, RAM, EEPROM and I/O circuits. One or more of the first SIM 204a and second SIM 204b used in various embodiments may contain user account information, an IMSI a set of SIM application toolkit (SAT) commands and storage space for phone book contacts. One or more of the first SIM 204a and second SIM 204b may further store home identifiers (e.g., a System Identification Number (SID)/Network Identification (NID) pair, a Home PLMN (HPLMN) code, etc.) to indicate the SIM network operator provider. An Integrated Circuit Card Identity (ICCID) SIM serial number may be printed on one or more SIMs 204 for identification.

The wireless communication device 200 may include at least one controller, such as a general purpose processor 206, which may be coupled to a coder/decoder (CODEC) 208. The CODEC 208 may in turn be coupled to a speaker 210 and a microphone 212. The general purpose processor 206 may also be coupled to at least one memory 214. The memory 214 may be a non-transitory tangible computer readable storage medium that stores processor-executable instructions. For example, the instructions may include routing communication data relating to a subscription though a corresponding baseband-RF resource chain. The memory 214 may store operating system (OS), as well as user application software and executable instructions.

In some embodiments, the wireless communication device 200 may be an MSMS device, such as a DSDS device, with both SIMs 204a, 204b sharing at least one baseband-RF resource chain that includes the baseband-modem processor 216—which may perform baseband/modem functions for communicating with/controlling a radio access technology—and an at least one RF resource 218. In some embodiments, the shared baseband-RF resource chain(s) may include, for each of the first SIM 204a and the second SIM 204b, separate baseband-modem processor 216 functionality (e.g., BB1 and BB2). The RF resource(s) 218 may implement separate transmit and receive functionalities, or may include a transceiver that combines transmitter and receiver functions. Further, the RF resource(s) 218 may include multiple sets of RF resource components (e.g., RF1 and RF2), which may be provided through separate transceivers, or as separate functionalities within the same transceiver. Each set of RF resource components may include at least two receive chains and one transmit chain to perform transmit/receive functions for the wireless services associated with each SIM 204a, 204b of the wireless communication device 200. Further, each set of RF resource components may be coupled to a group of least two antennas 220a, 220b.

The wireless communication device 200 may include at least one controller, such as a general-purpose processor 206, which may be coupled to a coder/decoder (CODEC) 208. The CODEC 208 may in turn be coupled to a speaker 210 and a microphone 212. The general purpose processor 206 may also be coupled to at least one memory 214. The memory 214 may be a non-transitory tangible computer readable storage medium that stores processor-executable instructions. For example, the instructions may include routing communication data relating to a subscription though the transmit chain and receive chain of a corresponding baseband-RF resource chain.

In some embodiments, the general purpose processor 206, memory 214, baseband-modem processor 216, and RF resource 218 may be included in a system-on-chip device 222. The first and second SIMs 204a, 204b and their corresponding interface(s) 202 may be external to the system-on-chip device 222. Further, various input and output devices may be coupled to components of the system-on-chip device 222, such as interfaces or controllers. Example user input components suitable for use in the wireless communication device 200 may include, but are not limited to, a keypad 224 and a touchscreen display 226.

In some embodiments, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in the wireless communication device 200 to enable communication between them, as is known in the art.

In a DSDS wireless communication device, such as the wireless communication device 200, the RF resource(s) 218 may be associated with multiple SIMs (e.g., 204a, 204b) and their corresponding protocol stacks, which may maintain some independent functionality when the wireless communication device is configured with multiple antennas and/or other receive chain components. In particular, certain DSDS device configurations may include baseband-modem processor and RF capabilities that support "receive diversity" on at least one SIM in which wireless signals are received from two (or more) base stations through appropriate network support. For example, the RF resource 218 may be configured with multiple RF front end components (e.g., antennas) that form simultaneous receive chains associated with at least one SIM. When the device is performing idle mode communications or participating in an active communication on a SIM (e.g., an ongoing data session or voice call), multiple RF receive chains may be used by the RF resource to support that communication, thereby implementing receive diversity. Such receive diversity may provide dramatic improvement in data throughput, and may prevent dropped calls in weak coverage areas.

Figure 3:
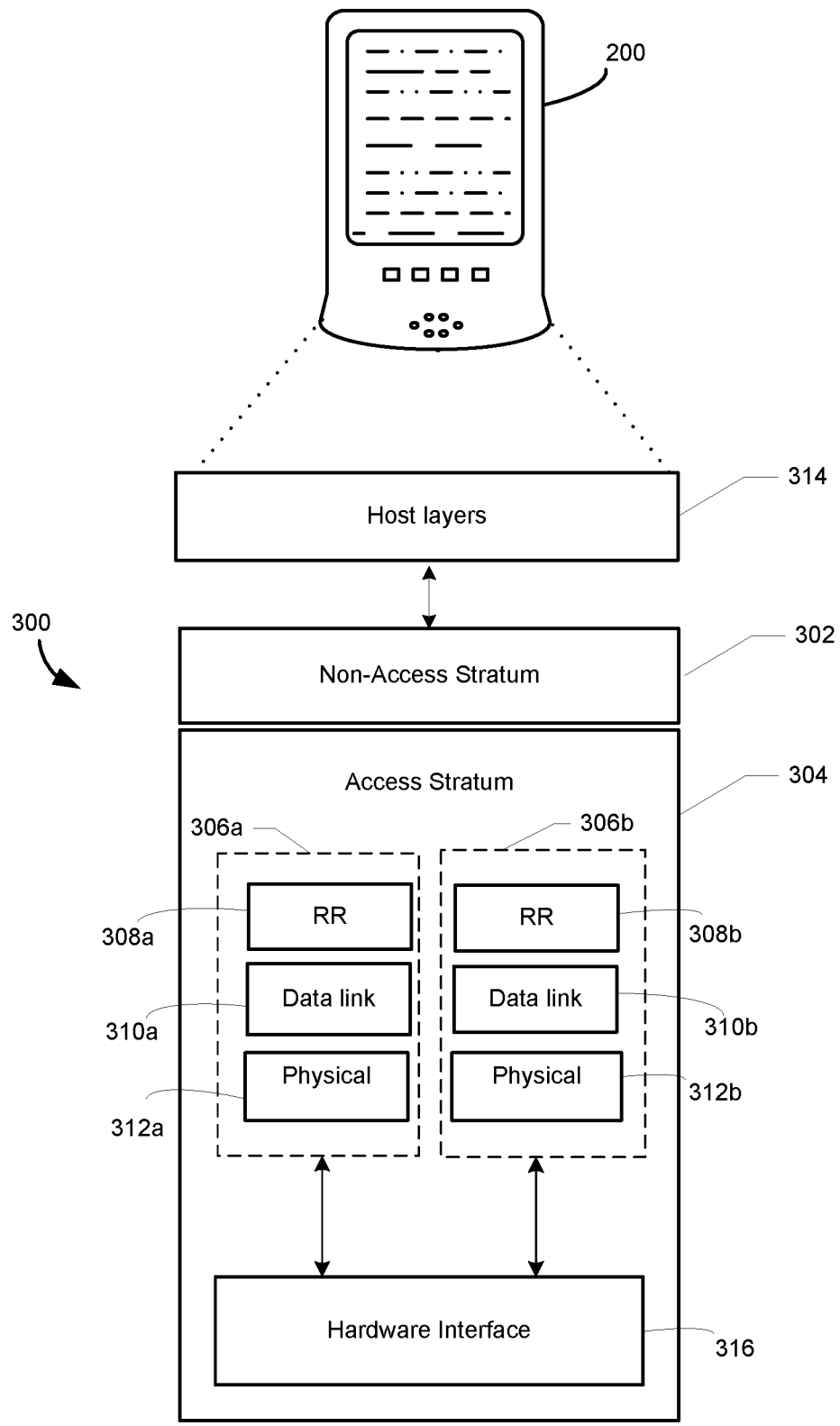
FIG. 3 is a system architecture diagram illustrating example protocol layer stacks implemented by the wireless communication device of FIG. 2.

FIG. 3 illustrates an example of a software architecture with layered radio protocol stacks that may be used in data communications on an MSMS wireless communication device. Referring to FIGS. 1-3, the wireless communication device 200 may have a layered software architecture 300 to communicate over access networks associated with SIMs. The software architecture 300 may be distributed among one or more processors, such as baseband-modem processor 306. The software architecture 350 may also include a Non Access Stratum (NAS) 302 and an Access Stratum (AS) 304. The NAS 302 may include functions and protocols to support traffic and signaling each SIM of the wireless communication device 200 (e.g., SIM-1 204a, SIM-2 204b) and their respective core networks. The AS 304 may include functions and protocols that support communication between each SIM (e.g., the SIM-1 204a, SIM-2 204b)) and entities of their respective access networks (e.g., a MSC in a GSM network, eNodeB in an LTE network, etc.).

In the wireless communication device 200, the AS 354 may include multiple protocol stacks, each of which may be associated with a different SIM. For example, the AS 304 may include protocol stacks 306a, 306b, associated with the first and second SIMs 204a, 204b, respectively. Although described below with reference to GSM-type communication layers, protocol stacks 306a, 306b may support any of variety of standards and protocols for wireless communications. In particular, the AS 304 may include at least three layers, each of which may contain various sublayers. For example, each protocol stack 306a, 306b may respectively include a Radio Resource (RR) sublayer 308a, 308b as part of Layer 3 (L3) of the AS 304 in a GSM or LTE signaling protocol. The RR sublayers 308a, 308b may oversee the establishment of a link between the wireless communication device 200 and associated access networks. In the various embodiments, the NAS 302 and RR sublayers 308a, 308b may perform various functions to search for wireless networks and to establish, maintain and terminate calls. Further, the RR sublayers 308a, 308b may provide functions including broadcasting system information, paging, and establishing and releasing a radio resource control (RRC) signaling connection between a multi-SIM wireless communication device 200 and the associated access network.

While not shown, the software architecture 300 may include additional Layer 3 sublayers, as well as various upper layers above Layer 3. Additional sub-layers may include, for example, connection management (CM) sub-layers (not shown) that route calls, select a service type, prioritize data, perform QoS functions, etc.

Residing below the Layer 3 sublayers (RR sublayers 308a, 308b), the protocol stacks 306a, 306b may also include data link layers 310a, 310b, which may be part of Layer 2 in a GSM or LTE signaling protocol. The data link layers 310a, 310b may provide functions to handle incoming and outgoing data across the network, such as dividing output data into data frames and analyzing incoming data to ensure the data has been successfully received In some embodiments, each data link layer 310a, 310b may contain various sublayers, such as a media access control (MAC) sublayer, a radio link control (RLC) sublayer, and a packet data convergence protocol (PDCP) sublayer, each of which form logical connections terminating at the access network. In various embodiments, a PDCP sublayer may provide uplink functions including multiplexing between different radio bearers and logical channels, sequence number addition, handover data handling, integrity protection, ciphering, and header compression. In the downlink, the PDCP sublayer may provide functions that include in-sequence delivery of data packets, duplicate data packet detection, integrity validation, deciphering, and header decompression.

In the uplink, the RLC sublayer may provide segmentation and concatenation of upper layer data packets, retransmission of lost data packets, and Automatic Repeat Request (ARQ). In the downlink, the RLC sublayer functions may include reordering of data packets to compensate for out-of-order reception, reassembly of upper layer data packets, and ARQ. In the uplink, the MAC sublayer may provide functions including multiplexing between logical and transport channels, random access procedure, logical channel priority, and hybrid-ARQ (HARQ) operations. In the downlink, the MAC layer functions may include channel mapping within a cell, de-multiplexing, DRX, and HARQ operations.

Residing below the data link layers 310a, 310b, the protocol stacks 306a, 306b may also include physical layers 312a, 312b, which may establish connections over the air interface and manage network resources for the wireless communication device 200. In various embodiments, the physical layers 312a, 312b may oversee functions that enable transmission and/or reception over the air interface. Examples of such physical layer functions may include cyclic redundancy check (CRC) attachment, coding blocks, scrambling and descrambling, modulation and demodulation, signal measurements, MIMO, etc.

While the protocol stacks 306a, 306b provide functions to transmit data through physical media, the software architecture 300 may further include at least one host layer 314 to provide data transfer services to various applications in the wireless communication device 200. In other embodiments, application-specific functions provided by the at least one host layer 314 may provide an interface between the protocol stacks 306a, 306b and the general purpose processor 206. In some embodiments, the protocol stacks 306a, 306b may each include one or more higher logical layers (e.g., transport, session, presentation, application, etc.) that provide host layer functions. For example, in some embodiments, the software architecture 300 may include a network layer (e.g., IP layer) in which a logical connection terminates at a gateway (e.g., PGW 163). In some embodiments, the software architecture 300 may include an application layer in which a logical connection terminates at another device (e.g., end user device, server, etc.). In some embodiments, the software architecture 300 may further include in the AS 304 a hardware interface 316 between the physical layers 312a, 312b and the communication hardware (e.g., one or more RF resources).

In various embodiments, the protocol stacks 306a, 306b of the layered software architecture may be implemented to allow modem operation using information provisioned on multiple SIMs. Therefore, a protocol stack that may be executed by a baseband-modem processor is interchangeably referred to herein as a modem stack.

As described, the modem stacks in various embodiments may support any of a variety of current and/or future protocols for wireless communications. For examples, the modem stacks in various embodiments may support networks using radio access technologies described in 3GPP standards (e.g., GSM, UMTS, LTE, etc.), 3GPP2 standards (e.g., 1xRTT/CDMA2000, EV-DO, UMB, etc.) and/or IEEE standards (e.g., WiMAX, Wi-Fi, etc.).

Various embodiments may include one or more RF switches implemented according to any of a number of suitable configurations. By changing the state of an RF switch, the path for signals received on antennas 220a, 220b may be controlled. In various embodiments, such RF switch control may be performed by a receive mode manager. Switch configurations may be applied with any number of antennas, RF receive chains, etc. Separate units of the baseband-modem processor 216 of the wireless communication device 200 may be implemented as separate structures or as separate logical units within the same structure, and may be configured to execute software including at least two protocol stacks/modem stacks associated with at least two SIMs, respectively. The SIMs and associated modem stacks may be configured to support a variety of communication services that fulfill different user requirements. Further, a particular SIM may be provisioned with information to execute different signaling procedures for accessing a domain of the core network associated with these services and for handling data thereof.

While access to an LTE network may be referred to herein with respect to the first or second SIM of the wireless communication device, it will be understood that network access procedures are performed on a modem stack associated with an IMSI (i.e., SIM) in the LTE system. That is, reference to the wireless communication device in various procedures and/or communications with a network may be a general reference to the user equipment associated with a subscription in the network. As such, a SIM transferred to different user equipment may be characterized as the same wireless communication device for purposes of network connections.

Each LTE operating band is associated with a range of carrier frequencies in the uplink and downlink. An LTE carrier channel is identified by both an uplink and downlink Evolved Absolute Radio Frequency Channel Number (EARFCN), which uniquely reflects the LTE band and center frequency of the uplink or downlink LTE carrier. In the uplink or downlink, the center frequency may be calculated for a given band based on the EARFCN, the lowest carrier frequency in the band, and the lowest defined EARFCN for the band. For example, for band 3, the downlink carrier frequency range is 1805-1880 MHz. Therefore, the wireless communication device would use the receive chains that support lower frequency bands to receive a communication on an LTE carrier channel in band 3. Other LTE bands in which the downlink carrier channels require use of receive chains supporting lower frequency bands include, for example, band 2, band 4, and band 5.

On the other hand, since the downlink carrier frequency range for LTE band 40 is 2300-2400 MHz, the wireless communication device would use the receive chains that support higher frequency bands to receive a communication on an LTE carrier channel in band 40. Other LTE bands in which the downlink carrier channels require use of receive chains supporting higher frequency bands may include, for example, band 7.

A wireless communication device (or modem stack associated with LTE operations) may access the LTE network (i.e., E-UTRAN) by connecting to a serving cell. Such connecting in LTE involves cell search and cell selection, derivation of system information, and performing an access procedure that is initiated using random access. In various embodiments, the cell search may involve performing a hierarchical search for LTE radio cells, which are identified by physical cell identities (PCIs). Specifically, the wireless communication device may tune to each supported LTE channel and measure the received signal strength indicator (RSSI) on each. Such channels may be determined based on LTE frequency bands supported by the operator, which may be stored in a SIM or in non-volatile memory on the device. The wireless communication device may decode synchronization and reference signals to find the physical cell identity of each channel that has an RSSI greater than a threshold value.

The wireless communication device (or modem stack associated with LTE operations) may decode system information blocks (SIBs) to determine the public land mobile network (PLMN) for the identified cell (i.e., in SIB1). As a result, the wireless communication device may develop a list with frequency, PCI, and PLMN of each identified cell, from which a cell may be selected for camping. In particular, the device may find a suitable cell by finding a cell that transmits power strong enough to be detected by wireless communication device (based on values decoded from SIB), that is not barred, and that has a PLMN matching that of a selected PLMN.

The wireless communication device (or modem stack associated with LTE operations) may camp on a serving cell, and transition between two states/modes defined by the RRC protocol; RRC idle mode, and RRC connected mode. In the RRC idle mode, the wireless communication device is not known in the E-UTRAN, but may receive broadcast system information and data, decode a paging channel to detect incoming calls, perform neighbor cell measurements, and perform cell reselections. In the RRC connected mode, the wireless communication device may be able to transmit data to and receive data from the network by an RRC connection established with a serving eNodeB that handles mobility and handovers. The access procedure that establishes a connection to the LTE network on the wireless communication device may be an RRC Connection establishment procedure. The RRC Connection establishment may involve Signaling Radio Bearer 1 (SRB1) establishment that is described in 3GPP TS 25.331 v. 3.3.0, entitled "Radio Resource Control (RRC); Protocol specification" (1999).

While camped on a serving cell, the wireless communication device may periodically search for, and measure signal strength of, neighbor cells. Such neighbor cells, which may include LTE carrier channels (inter-frequency cells) and channels of other RATs (inter-RAT cells), are identified in system information broadcast by the serving cell. For example, the carrier frequencies of inter-frequency neighbor cells may be provided in SIB5. For inter-RAT neighbor cells, SIB6 may provide the carrier frequencies and scrambling codes for WCDMA neighbor cells, while the ARFCNs of the broadcast control channel (BCCH) carriers for GERAN neighbor cells may be provided in SIB7.

As described, the sharing of RF resource components (e.g., receive chains and transmit chains) between modem stacks associated with two SIMs may enable simultaneous operation in idle mode (e.g., RRC idle mode) but does not extend such operation during active communications (e.g., RRC connected mode) or other extensive RF resource use by one SIM.

In various embodiments, the wireless communication device may enable full service (e.g., simultaneous communications) on the modem stack associated with a first SIM during an active communication or tune-away associated with the second SIM. In particular, the wireless communication device may maintain a list or other indication of the receive chains that are not currently being used for the communication or tune-away associated with the second SIM. Using this availability, information about the capability of each available receive chain, and information about the identity and RF conditions of the neighbor cell carrier frequencies, the modem stack associated with the first SIM may be directed to camp on a target cell that is compatible with the downlink frequencies supported by the available receive chains. If such target cell is another LTE carrier, the camping may involve receiving system information by tuning to the target LTE carrier frequency. If such target cell is a carrier in another RAT, the modem stack associated with the first SIM may first override existing PLMN selection parameters to perform system acquisition in the other RAT, followed by camping on the target cell.

For example, the wireless communication device may be camped in RRC idle mode, or engaged in an active data session in RRC connected mode, in an LTE network. A mobile terminating call for the second SIM may be received in a network associated with the second SIM (e.g., GSM network, LTE network, etc.). For example, if the second SIM is camped in or connected to a GSM network, the mobile terminating call may employ a carrier channel the DCS-1800 band, which is associated with downlink frequencies 1805-1879 MHz. In another example, if the second SIM is camped in or connected to an LTE network, the mobile terminating call may employ a carrier channel in Band 3, which is similarly associated with downlink frequencies 1805-1880 MHz.

The wireless communication device may use a first set of RF resource components operable for low frequency bands for the voice call on the modem stack associated with the second SIM. For example, such first set of RF resource components may include a first receive chain and second receive chain (e.g., primary and diversity receive chains) configured to receive signals on downlink carrier frequencies in the range 0-2000 MHz. The first set of RF resource components may further include a first transmit chain configured to transmit signals on uplink carrier frequencies in the range of 0-2000 MHz. The wireless communication device may maintain a list of receive chains that are currently unused (i.e., available receive chains). Based on the use of the first set of RF resource components, the wireless communication device may identify a second set of RF resource components that are available for use on the modem stack associated with the first SIM. In some embodiments, the second set of RF resource components may include a third receive chain and a fourth receive chain (e.g., primary and diversity receive chains), as well as a transmit chain. In some embodiments, the third and fourth receive chains may be operable to receive signals on high frequency bands (e.g., on downlink carrier frequencies above 2000 MHz), and the transmit chain may be operable to send uplink signals on high frequency bands The wireless communication device may determine whether the downlink carrier frequency of the serving cell for the modem stack associated with the first SIM is within the high frequency bands supported by the third and fourth receive chains. For example, such serving cell may be in an LTE network, and may be associated with a downlink carrier channel in Band 7 (i.e., 2500-2570 MHz) or Band 40 (i.e., 2300-2400 MHz).

If the serving cell is not within the high frequency bands, the wireless communication device may access the neighbor cell database, and identify any neighbor cells in which the downlink carrier frequency is within the high frequency bands supported by the third and fourth receive chains. The identities and/or carrier frequencies of neighbor cells may be provided to the wireless communication device by the E-UTRAN through various system information blocks. For example, the wireless communication device may decode SIB5 to identify LTE neighbor cells, SIB6 to identify WCDMA neighbor cells, and SIB7 to identify GERAN neighbor cells. A neighbor cell that has such a high frequency downlink carrier may be selected for camping by the modem stack associated with the first SIM, allowing communication activities supported by the first SIM (e.g., maintaining a data session, receiving pages, etc.) to continue during the active call for the second SIM.

While descriptions of various embodiments address managing receive mode switching as among two SIMs for use of receive chains and/or transmit chains associated with one RF resource, various embodiment processes may be implemented to manage receive mode switching and/or transmit mode switching between more than two SIMs and/or RF resources of more than two SIMs. For example, an RF mode manager may be configured to switch between dual receive modes and a fallback hybrid receive mode among three SIMs for use of receive chains and transmit chains associated with two shared RF resources, among four SIMs for use of receive chains and transmit chains associated with three shared RF resources, etc. In various embodiments, the RF mode manager may output control signals to the protocol stacks associated with the first and second SIMs, and/or to one or more switches associated with the RF resource 218 and/or antenna(s) 220.

Figure 4A:
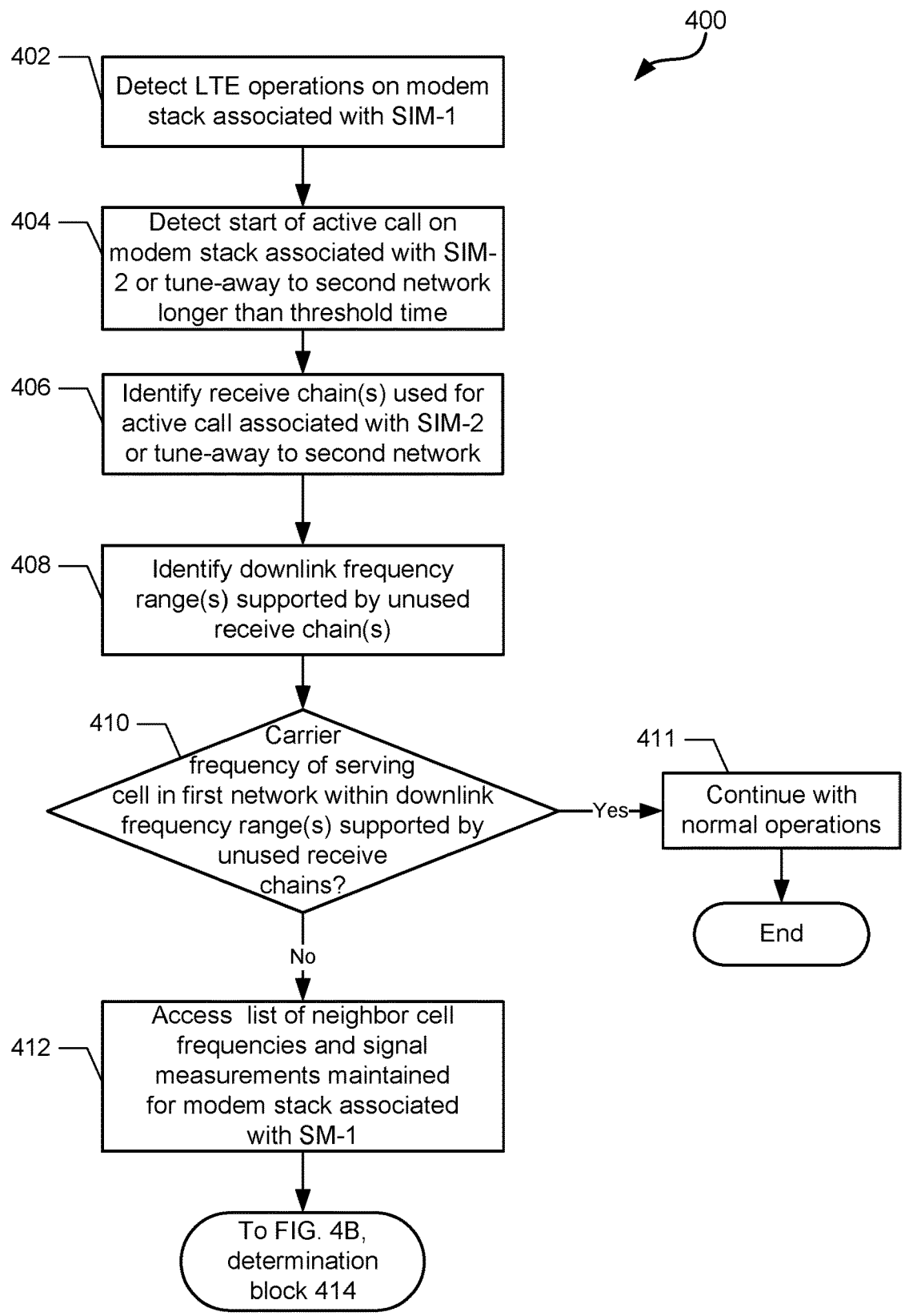
FIGS. 4A-4C are process flow diagrams illustrating a method for managing the use of RF resource components to improve performance on a multi-SIM wireless communication device according to various embodiments.
Figure 4B:
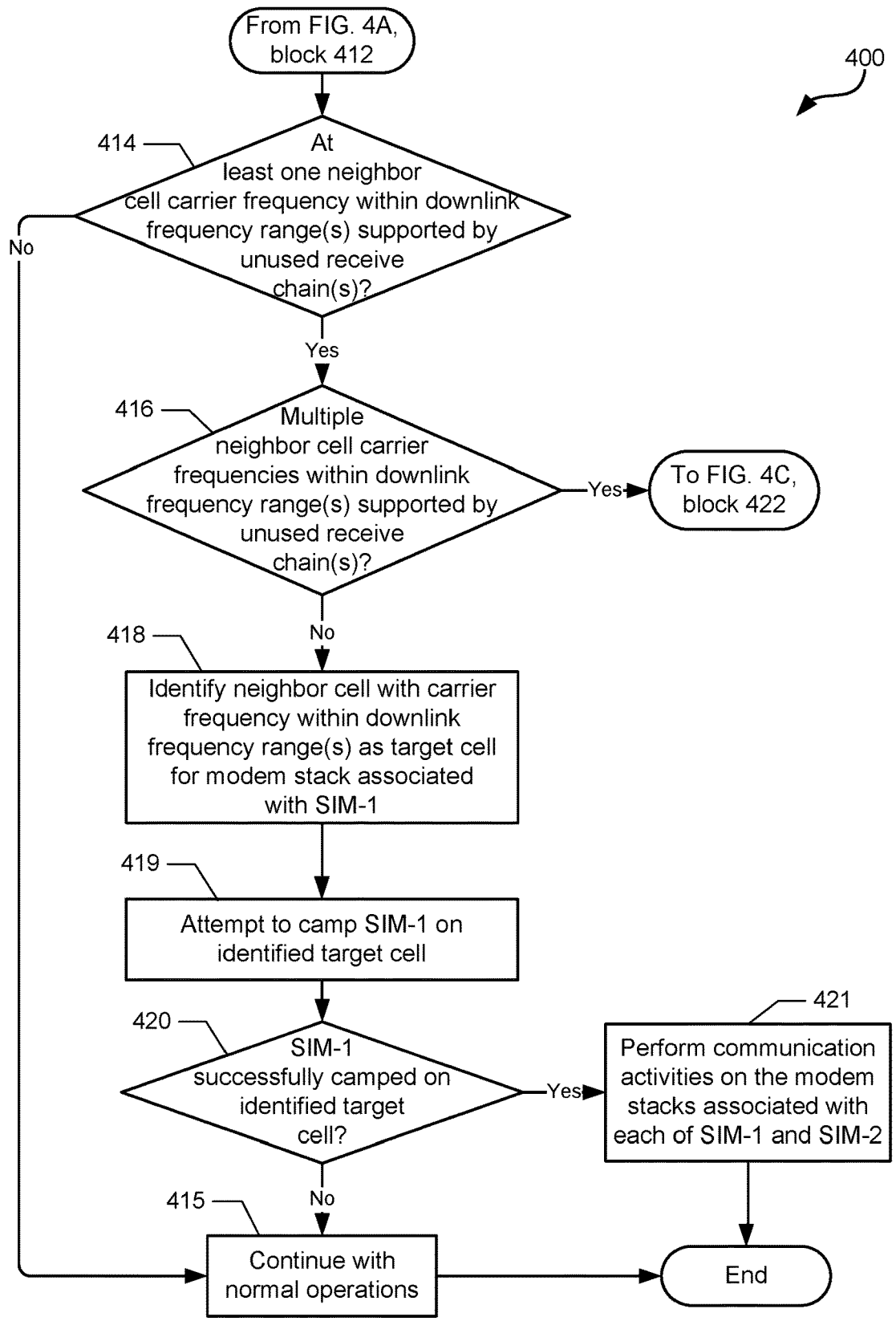
Figure 4C:
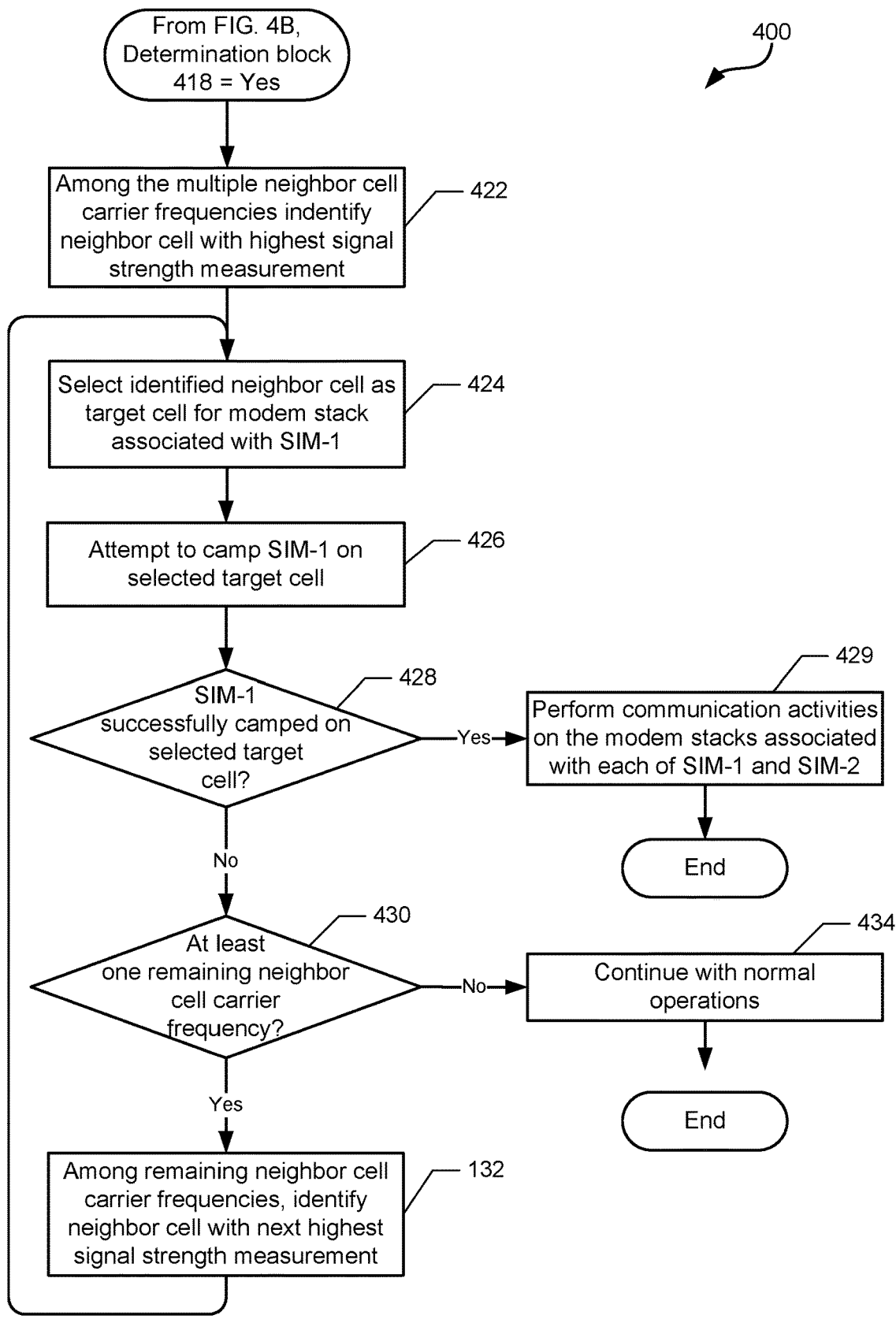

FIGS. 4A-4C illustrate a method 400 for controlling the receive chain(s) and/or transmit chain(s) used to connect to a first network in order to maintain service during use of RF resource components for activities in a second network on a MSMS wireless communication device. With reference to FIGS. 1-4B, the multi-SIM multi-standby device may be configured with one or more shared RF resources (e.g., 218). In various embodiments, the operations of the method 400 may be implemented in a RF mode manager 308 by one or more processors of the wireless communication device, such as a general purpose processor (e.g., 206) and/or baseband-modem processor (e.g., 216), or a separate controller (not shown) that may be coupled to memory (e.g., 214) and to a baseband-modem processor.

In block 402, the wireless communication device processor may detect LTE operations on the modem stack associated with the first SIM ("SIM-1"). As described, the wireless communication device (e.g., 102, 200) may be a multi-SIM multi-standby (MSMS) device in which at least two SIMs share access to the same RF resource(s). In various embodiments, the modem stack associated with the first SIM may be camped in the first network using a first radio access technology, and the modem stack associated with the second SIM may camped in the second network using a second radio access technology. In some embodiments, the first and second networks may be the same network, while in some embodiments the first and second networks may be different networks. The modem stack associated with the each of the first SIM and second SIM may be in either an RRC idle mode, or in an RRC connected mode for a data communication.

In block 404, the wireless communication device processor may detect the start of an active call on the modem stack associated with the second SIM, or a tune-away to the second network that has lasted longer than a threshold time period. For example, start of the active call may be caused by receipt of a paging message for a mobile terminating call to the second SIM, or triggered by user input requesting a mobile originating call on the modem stack associated with the second SIM. In some embodiments, the modem stack associated with the second SIM may perform a long tune-away to the second network for a variety of reasons, for example, receiving and decoding a short messaging service (SMS) communication for the second SIM, performing a location area update in the second network, etc. The threshold time period for the tune-away to the second network may be configured by default on the wireless communication device, by the user, by the E-UTRAN, etc. Such threshold time period may be, for example, five seconds, ten seconds, etc.

The wireless communication device processor may identify the receive chain(s) and transmit chain used for the active call associated with the second SIM or the tune-away to the second network in block 406. As described, in order to support LTE, an RF resource may include a set of multiple components, including at least two receive chains and at least one transmit chain. Further, as described, devices that support inter-band LTE carrier aggregation may be configured with at least two sets of RF resource components, providing a total of at least four receive chains and two transmit chains. In various embodiments, the receive and transmit operations for the active call or long tune-away on the modem stack associated with the second SIM may be performed through the RF resource components that are compatible with the downlink and uplink carrier frequencies being used. The wireless communication device may maintain a list of the RF resource components, such as the receive chain(s) and/or transmit chain that are currently in use by the modem stack associated with the second SIM, and those that are currently unused.

In block 408, the wireless communication device processor may identify the frequency range(s) supported by one or more unused receive chains. Such information about frequency ranges may be pre-configured on the wireless communication device.

In determination block 410, the wireless communication device processor may determine whether the carrier frequency of the serving cell in the first network is within a downlink frequency range(s) supported by one or more unused receive chains. In response to determining that the carrier the carrier frequency of the serving cell in the first network is within the downlink frequency range(s) supported by at least one unused receive chain (i.e., determination block 410="Yes"), the wireless communication device processor may continue with normal operations in block 411, allowing activities on the modem stack associated with the first SIM to proceed.

In response to determining that the carrier frequency of the serving cell in the first network is not within the downlink frequency range(s) supported by at least one unused receive chain (i.e., determination block 410="No"), the wireless communication device processor may access a list of neighbor cell frequencies and signal measurements maintained on the modem stack associated with the first SIM in block 412. As described, the wireless communication device processor may identify, for each of the first and second SIMs, a set of intra-RAT and inter-RAT neighbor cells based on system information received from the corresponding LTE network. Further, for each SIM, the wireless communication device processor may periodically measure signal properties on the downlink carrier frequency for each neighbor cell. Such properties may include, for example, received signal strength indicator (RSSI) values, received channel power indicator (RCPI) values, etc. The signal measurements, and identities or carrier frequencies of the associated neighbor cells, may be stored, for each SIM, in a neighbor cell database.

Referring to FIG. 4B, in determination block 414, the wireless communication device processor may determine whether at least one neighbor cell carrier frequency is within the downlink frequency range(s) supported by one or more unused receive chains. In response to determining that there is not at least one neighbor cell carrier frequency within the downlink frequency range(s) supported by one or more unused receive chains (i.e., determination block 414="No"), the wireless communication device processor may continue with normal operations in block 415, in which activities on the modem stack associated with the first SIM may be interrupted due to loss of service.

In response to determining that at least one neighbor cell carrier frequency is within the downlink frequency range(s) supported by one or more unused receive chains (i.e., determination block 414="Yes"), the wireless communication device processor may determine whether multiple neighbor cell carrier frequencies are within the downlink frequency range(s) supported by one or more unused receive chains in determination block 416.

In response to determining that there are not multiple neighbor cell carrier frequencies within the downlink frequency range(s) supported by one or more unused receive chains (i.e., determination block 416="No"), the wireless communication device processor may identify a neighbor cell with the carrier frequency that is within the downlink frequency range(s) as a target cell for the modem stack associated with the first SIM in block 418. If multiple neighbor cells in the vicinity of the wireless communication device are broadcasting on the same carrier frequency that is within the downlink frequency range(s) (intra-frequency cells), the target cell that is identified may be the intra-frequency cell having the highest signal strength.

In block 419, the wireless communication device processor may attempt to camp the first SIM on the identified target cell. In determination block 420, the wireless communication device processor may determine whether the first SIM has successfully camped on the identified target cell.

In response to determining that the first SIM is successfully camped on the selected target cell (i.e., determination block 420="Yes"), the wireless communication device processor may perform communication activities on the modem stacks associated with each of the first and second SIMs in block 421.

In response to determining that the first SIM is not successfully camped on the identified target cell (i.e., determination block 420="No"), the wireless communication device processor may continue with normal operations in block 415, in which activities on the modem stack associated with the first SIM may be interrupted due to loss of service.

In response to determining that multiple neighbor cell carriers frequencies are within the downlink frequency range(s) supported by one or more unused receive chains (i.e., determination block 416="Yes"), the wireless communication device processor may identify, among the multiple neighbor cell carrier frequencies, the neighbor cell with the highest signal strength in block 422 (FIG. 4C). Such an identification may be made, for example, based on the most recent signal measurements stored in the neighbor cell database.

In block 424, the wireless communication device processor may select the identified neighbor cell as a target cell for the modem stack associated with the first SIM.

In block 426, the wireless communication device processor may attempt to camp the first subscription associated with the first SIM on the selected target cell, which may be another cell within the first network or a cell within a new network.

In determination block 428, the wireless communication device processor may determine whether the first SIM has successfully camped on the selected target cell.

In response to determining that the first SIM is successfully camped on the selected target cell (i.e., determination block 428="Yes"), the wireless communication device processor may perform communication activities on the modem stacks associated with each of the first and second SIMs in block 429.

In response to determining that the first SIM is not successfully camped on the selected target cell (i.e., determination block 428="No"), the wireless communication device processor may determine whether there is at least one remaining neighbor cell carrier frequency in determination block 430.

In response to determining that there is at least one remaining neighbor cell frequency (i.e., determination block 430="Yes"), the wireless communication device processor may identify, among the remaining neighbor cell carrier frequencies, the neighbor cell with the next highest signal strength in block 432. Such identification may also be made, for example, based on the most recent signal measurements stored in the neighbor cell database.

In block 424 the wireless communication device processor may select the identified neighbor cell as the target cell for the modem stack associated with the first SIM, and attempt to camp the first subscription associated with the first SIM on the selected target cell in block 426.

In response to determining that there is not at least one remaining neighbor cell carrier frequency (i.e., determination block 430="No"), the wireless communication device processor may continue with normal operations in block 434, in which activities on the modem stack associated with the first SIM may be interrupted due to loss of service.

In other words, if the attempt to camp on the first neighbor cell is unsuccessful, the wireless communication device processor may repeat the operations by traversing the list of neighbor cell carrier frequencies supported by unused receive chain(s) in order of signal strength until the first SIM is successfully camped, or until there are no remaining neighbor cell carrier frequencies.

As a result of the management process implemented by the wireless communication device processor, the modem stack associated with the first SIM may be prompted to perform communication activities using unused receive chain(s), thereby maximizing the opportunity to remain in service with respect to the first SIM.

Figure 5:
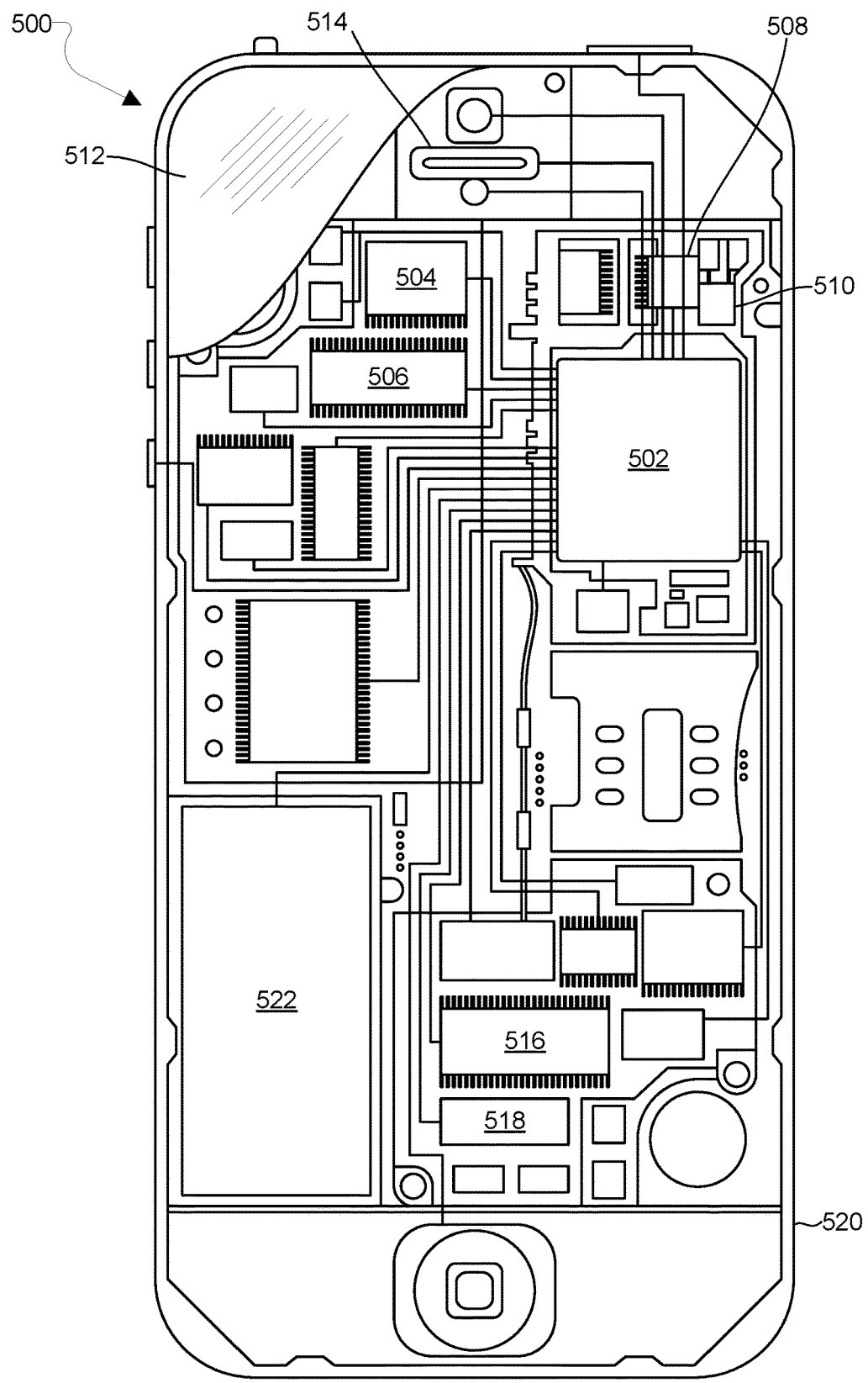
FIG. 5 is a component diagram of an example wireless communication device suitable for use with various embodiments.

Various embodiments may be implemented in any of a variety of wireless communication devices, an example of which is illustrated in FIG. 5. For example, with reference to FIGS. 1-5, a wireless communication device 500 (which may correspond, for example, the wireless communication devices 102, 200 in FIGS. 1-2) may include a processor 502 coupled to a touchscreen controller 504 and an internal memory 506. The processor 502 may be one or more multicore integrated circuits (ICs) designated for general or specific processing tasks. The internal memory 506 may be volatile or non-volatile memory, and may also be secure and/or encrypted memory, or unsecure and/or unencrypted memory, or any combination thereof.

The touchscreen controller 504 and the processor 502 may also be coupled to a touchscreen panel 512, such as a resistive-sensing touchscreen, capacitive-sensing touchscreen, infrared sensing touchscreen, etc. The wireless communication device 500 may have one or more radio signal transceivers 508 (e.g., Peanut®, Bluetooth®, Zigbee®, Wi-Fi, RF radio) and antennae 510, for sending and receiving, coupled to each other and/or to the processor 502. The transceivers 508 and antennae 510 may be used with the above-mentioned circuitry to implement the various wireless transmission protocol stacks and interfaces. The wireless communication device 500 may include a cellular network wireless modem chip 516 that enables communication via a cellular network and is coupled to the processor. The wireless communication device 500 may include a peripheral device connection interface 518 coupled to the processor 502. The peripheral device connection interface 518 may be singularly configured to accept one type of connection, or multiply configured to accept various types of physical and communication connections, common or proprietary, such as USB, FireWire, Thunderbolt, or PCIe. The peripheral device connection interface 518 may also be coupled to a similarly configured peripheral device connection port (not shown). The wireless communication device 500 may also include speakers 514 for providing audio outputs. The wireless communication device 500 may also include a housing 520, constructed of a plastic, metal, or a combination of materials, for containing all or some of the components discussed herein. The wireless communication device 500 may include a power source 522 coupled to the processor 502, such as a disposable or rechargeable battery. The rechargeable battery may also be coupled to the peripheral device connection port to receive a charging current from a source external to the wireless communication device 500.

Figure 6:
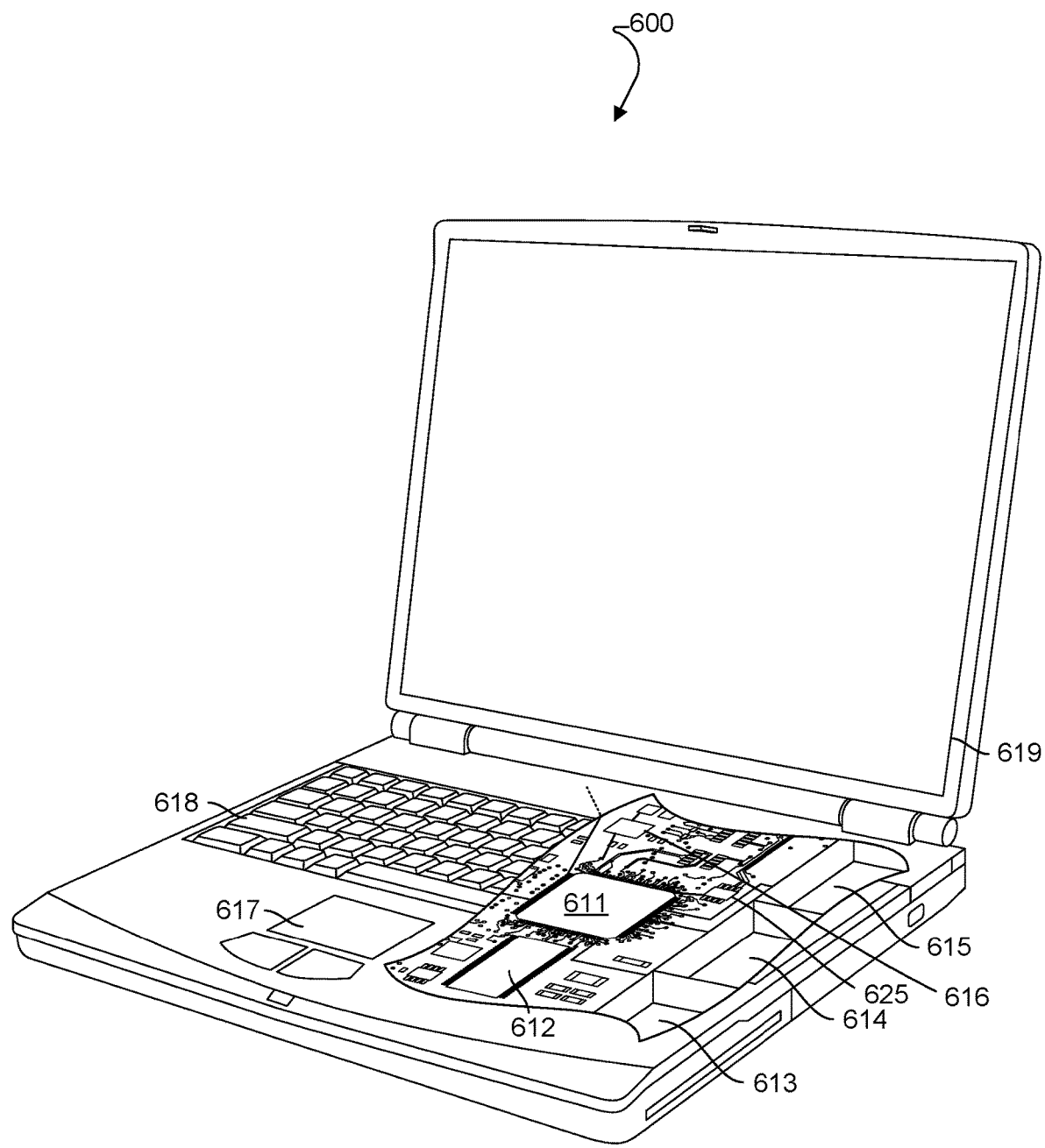
FIG. 6 is a component diagram of another example wireless communication device suitable for use with various embodiments.

Various embodiments described above may also be implemented within a variety of personal computing devices, such as a laptop computer 600 (which may correspond, for example, the wireless communication devices 102,200 in FIGS. 1-2) as illustrated in FIG. 6. With reference to FIGS. 1-6, many laptop computers include a touchpad touch surface 617 that serves as the computer's pointing device, and thus may receive drag, scroll, and flick gestures similar to those implemented on wireless computing devices equipped with a touch screen display and described above. The laptop computer 600 will typically include a processor 611 coupled to volatile memory 612 and a large capacity nonvolatile memory, such as a disk drive 613 of Flash memory. The laptop computer 600 may also include a floppy disc drive 614 and a compact disc (CD) drive 615 coupled to the processor 611. The laptop computer 600 may also include a number of connector ports coupled to the processor 611 for establishing data connections or receiving external memory devices, such as a USB or FireWire® connector sockets, or other network connection circuits for coupling the processor 611 to a network. In a notebook configuration, the computer housing includes the touchpad touch surface 617, the keyboard 618, and the display 619 all coupled to the processor 611. Other configurations of the computing device may include a computer mouse or trackball coupled to the processor (e.g., via a USB input) as are well known, which may also be use in conjunction with various embodiments.

The processors 502 and 611 may be any programmable microprocessor, microcomputer or multiple processor chip or chips that can be configured by software instructions (applications) to perform a variety of functions, including the functions of various embodiments described above. In some devices, multiple processors may be provided, such as one processor dedicated to wireless communication functions and one processor dedicated to running other applications. Typically, software applications may be stored in the internal memory 506, 612 and 613 before they are accessed and loaded into the processors 502 and 611. The processors 502 and 611 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 502, 611, including internal memory or removable memory plugged into the device and memory within the processor 502 and 611, themselves.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of improving performance on a wireless communication device having at least a first subscriber identity module (SIM) and a second SIM sharing access to a radio frequency (RF) resource that includes multiple receive chains and at least one transmit chain, the method comprising:

detecting, during a connection to a first network on a modem stack associated with the first SIM, a start of a communication activity on a modem stack associated with the second SIM, wherein:
  the modem stack associated with the first SIM is camped on a serving cell in the first network; and
  the communication activity on the modem stack associated with the second SIM uses one or more of the multiple receive chains of the RF resource;

determining whether a carrier frequency of the serving cell in the first network is within a downlink frequency range supported by at least one unused receive chain of the RF resource, wherein the downlink frequency range corresponds to a group of either low-frequency or high-frequency bands in which the at least one unused receive chain is configured to receive signals; and in response to determining that the carrier frequency of the serving cell in the first network is not within the downlink frequency range supported by at least one unused receive chain of the RF resource:
  identifying, from a set of neighbor cells associated with the first SIM, a neighbor cell that has a carrier frequency within a downlink frequency range supported by at least one unused receive chain of the RF resource; and
  attempting to camp the first SIM on the identified neighbor cell while continuing the communication activity on the modem stack associated with the second SIM.

2. The method of claim 1, further comprising:
identifying the one or more of the multiple receive chains used for the communication activity on the modem stack associated with the second SIM based on a radio access technology and current serving cell of the modem stack associated with the second SIM;
identifying at least one unused receive chain of the RF resource; and
identifying downlink frequencies supported by the at least one unused receive chain by accessing configurations stored on the wireless communication device.

3. The method of claim 2, wherein identifying a neighbor cell that has a carrier frequency within a downlink frequency range supported by at least one unused receive chain of the RF resource comprises:
accessing a neighbor cell database for the modem stack associated with the first SIM; and
comparing neighbor cell carrier frequencies with the identified downlink frequencies supported by each unused receive chain.

4. The method of claim 3, further comprising creating the neighbor cell database for the modem stack associated with the first SIM by:
identifying a set of neighbor cells for the modem stack associated with the first SIM based on system information received from the first network;
periodically measuring signal properties on a downlink carrier frequency for each neighbor cell; and
storing in the neighbor cell database information identifying each neighbor cell with corresponding recent signal measurements.

5. The method of claim 1, further comprising:
identifying one or more transmit chains used for the communication activity on the modem stack associated with the second SIM based on a radio access technology and current serving cell of the modem stack associated with the second SIM;
identifying any unused transmit chains of the RF resource;
identifying uplink frequencies supported by any unused transmit chains by accessing configurations stored on the wireless communication device; and
using identified uplink frequencies to identify downlink frequencies supported by at least one unused receive chain.

6. The method of claim 1, wherein detecting the start of a communication activity on the modem stack associated with the second SIM comprises detecting the start of a voice call on the modem stack associated with the second SIM.

7. The method of claim 1, wherein detecting the start of a communication activity on the modem stack associated with the second SIM comprises detecting the modem stack associated with the second SIM tuning to a second network supported by the second SIM for longer than a threshold time duration, and
wherein the connection to the first network on the modem stack associated with the first SIM is an active data session.

8. The method of claim 1, further comprising:
determining whether multiple neighbor cell carrier frequencies are within a downlink frequency range supported by at least one unused receive chain of the RF resource; and
selecting, from among the multiple neighbor cell carrier frequencies, a target cell having a highest signal strength in response to determining that multiple neighbor cell carrier frequencies are within the downlink frequency range supported by the at least one unused receive chain,
wherein attempting to camp the first SIM on the identified neighbor cell comprises attempting to camp the first SIM on the target cell.

9. The method of claim 8, further comprising:
determining whether attempting to camp the first SIM on the target cell was successful; and
in response to determining that attempting to camp the first SIM on the target cell was not successful:
selecting, from among remaining neighbor cell carrier frequencies, a target cell having a next highest signal strength; and
repeating attempting to camp the first SIM on the selected target cell.

10. The method of claim 1, wherein the RF resource comprises at least two sets of RF resource components, wherein:
each set of RF resource components is configured to support a different range of uplink and downlink carrier frequencies; and
each set of RF resource components includes at least one transmit chain and at least two receive chains configured to enable receive diversity.

11. A wireless communication device, comprising:
a memory;
a radio frequency (RF) resource including multiple receive chains and at least one transmit chain; and
a processor coupled to the memory and the RF resource, configured to connect to at least a first subscriber identity module (SIM) and a second SIM that share access to the RF resource, and configured with processor-executable instructions to:
detect, during a connection to a first network on a modem stack associated with the first SIM, a start of a communication activity on a modem stack associated with the second SIM, wherein:
the modem stack associated with the first SIM is camped on a serving cell in the first network; and
the communication activity on the modem stack associated with the second SIM uses one or more of the multiple receive chains of the RF resource;
determine whether a carrier frequency of the serving cell in the first network is within a downlink frequency range supported by at least one unused receive chain of the RF resource, wherein the downlink frequency range corresponds to a group of either low-frequency or high-frequency bands in which the at least one unused receive chain is configured to receive signals; and
in response to determining that the carrier frequency of the serving cell in the first network is not within the downlink frequency range supported by at least one unused receive chain of the RF resource:
identify, from a set of neighbor cells associated with the first SIM, a neighbor cell that has a carrier frequency within a downlink frequency range supported by at least one unused receive chain of the RF resource; and
attempt to camp the first SIM on the identified neighbor cell while continuing the communication activity on the modem stack associated with the second SIM.

12. The wireless communication device of claim 11, wherein the processor is further configured with processor-executable instructions to:

identify the one or more of the multiple receive chains used for the communication activity on the modem stack associated with the second SIM based on a radio access technology and current serving cell of the modem stack associated with the second SIM;

identify at least one unused receive chain of the RF resource; and identify downlink frequencies supported by the at least one unused receive chain by accessing configurations stored on the wireless communication device.

13. The wireless communication device of claim 12, wherein the processor is further configured with processor-executable instructions to identify a neighbor cell that has a carrier frequency within a downlink frequency range supported by at least one unused receive chain of the RF resource by:

accessing a neighbor cell database for the modem stack associated with the first SIM; and comparing neighbor cell carrier frequencies with the identified downlink frequencies supported by each unused receive chain.

14. The wireless communication device of claim 13, wherein the processor is further configured with processor-executable instructions to create the neighbor cell database for the modem stack associated with the first SIM by:

identifying a set of neighbor cells for the modem stack associated with the first SIM based on system information received from the first network;

periodically measuring signal properties on a downlink carrier frequency for each neighbor cell; and storing in the neighbor cell database information identifying each neighbor cell with corresponding recent signal measurements.

15. The wireless communication device of claim 11, wherein the processor is further configured with processor-executable instructions to:

identify one or more transmit chain used for the communication activity on the modem stack associated with the second SIM based on a radio access technology and current serving cell of the modem stack associated with the second SIM;

identify any unused transmit chains of the RF resource;

identify uplink frequencies supported by any unused transmit chains by accessing configurations stored on the wireless communication device; and use identified uplink frequencies to identify downlink frequencies supported by at least one unused receive chain.

16. The wireless communication device of claim 11, wherein the processor is further configured with processor-executable instructions to detect the start of a communication activity on the modem stack associated with the second SIM by detecting the start of a voice call on the modem stack associated with the second SIM.

17. The wireless communication device of claim 11, wherein the processor is further configured with processor-executable instructions to detect the start of a communication activity on the modem stack associated with the second SIM by detecting the modem stack associated with the second SIM tuning to a second network supported by the second SIM for longer than a threshold time duration, and wherein the connection to the first network on the modem stack associated with the first SIM is an active data session.

18. The wireless communication device of claim 11, wherein the processor is further configured with processor-executable instructions to:

determine whether multiple neighbor cell carrier frequencies are within a downlink frequency range supported by at least one unused receive chain of the RF resource; and select, from among the multiple neighbor cell carrier frequencies, a target cell having a highest signal strength in response to determining that multiple neighbor cell carrier frequencies are within the downlink frequency range supported by the at least one unused receive chain, wherein the processor is further configured with processor-executable instructs to attempt to camp the first SIM on the identified neighbor cell by attempting to camp the first SIM on the target cell.

19. The wireless communication device of claim 18, wherein the processor is further configured with processor-executable instructions to:

determine whether attempting to camp the first SIM on the target cell was successful; and in response to determining that attempting to camp the first SIM on the target cell was not successful:

select, from among remaining neighbor cell carrier frequencies, a target cell having a next highest signal strength; and repeat attempting to camp the first SIM on the selected target cell.

20. The wireless communication device of claim 11, wherein the RF resource comprises at least two sets of RF resource components, wherein:

each set of RF resource components is configured to support a different range of uplink and downlink carrier frequencies; and each set of RF resource components includes at least one transmit chain and at least two receive chains configured to enable receive diversity.

21. A wireless communication device, comprising:

a radio frequency (RF) resource that includes multiple receive chains and at least one transmit chain, wherein access to the RF resource is shared by at least a first subscriber identity module (SIM) and a second SIM;

means for detecting, during a connection to a first network on a modem stack associated with the first SIM, a start of a communication activity on a modem stack associated with the second SIM, wherein:

the modem stack associated with the first SIM is camped on a serving cell in the first network; and the communication activity on the modem stack associated with the second SIM uses one or more of the multiple receive chains of the RF resource;

means for determining whether a carrier frequency of the serving cell in the first network is within a downlink frequency range supported by at least one unused receive chain of the RF resource, wherein the downlink frequency range corresponds to a group of either low-frequency or high-frequency bands in which the at least one unused receive chain is configured to receive signals;

means for identifying, from a set of neighbor cells associated with the first SIM, a neighbor cell that has a carrier frequency within a downlink frequency range supported by at least one unused receive chain of the RF resource in response to determining that the carrier frequency of the serving cell in the first network is not within the downlink frequency range supported by at least one unused receive chain of the RF resource; and means for attempting to camp the first SIM on the identified neighbor cell while continuing the communication activity on the modem stack associated with the second SIM.

22. A non-transitory processor-readable storage medium having stored thereon processor-executable instructions configured to cause a processor of a wireless communication device configured with a radio frequency (RF) resource including multiple receive chains and at least one transmit chain, to which access is shared between at least a first subscriber identity module (SIM) and a second SIM, to perform operations comprising:
  detecting, during a connection to a first network on a modem stack associated with the first SIM, a start of a communication activity on a modem stack associated with the second SIM, wherein:
    the modem stack associated with the first SIM is camped on a serving cell in the first network; and
    the communication activity on the modem stack associated with the second SIM uses one or more of the multiple receive chains of the RF resource;
  determining whether a carrier frequency of the serving cell in the first network is within a downlink frequency range supported by at least one unused receive chain of the RF resource, wherein the downlink frequency range corresponds to a group of either low-frequency or high-frequency bands in which the at least one unused receive chain is configured to receive signals; and
  in response to determining that the carrier frequency of the serving cell in the first network is not within the downlink frequency range supported by at least one unused receive chain of the RF resource:
    identifying, from a set of neighbor cells associated with the first SIM, a neighbor cell that has a carrier frequency within a downlink frequency range supported by at least one unused receive chain of the RF resource; and
    attempting to camp the first SIM on the identified neighbor cell while continuing the communication activity on the modem stack associated with the second SIM.

23. The non-transitory processor-readable storage medium of claim 22, wherein the stored processor-executable instructions are configured to cause the processor of the wireless communication device to perform operations further comprising:
  identifying the one or more of the multiple receive chains used for the communication activity on the modem stack associated with the second SIM based on a radio access technology and current serving cell of the modem stack associated with the second SIM;
  identifying at least one unused receive chain of the RF resource; and
  identifying downlink frequencies supported by the at least one unused receive chain by accessing configurations stored on the wireless communication device.

24. The non-transitory processor-readable storage medium of claim 23, wherein the stored processor-executable instructions are configured to cause the processor of the wireless communication device to perform operations such that identifying a neighbor cell that has a carrier frequency within a downlink frequency range supported by at least one unused receive chain of the RF resource comprises:
  accessing a neighbor cell database for the modem stack associated with the first SIM; and
  comparing neighbor cell carrier frequencies with the identified downlink frequencies supported by each unused receive chain.

25. The non-transitory processor-readable storage medium of claim 24, wherein the stored processor-executable instructions are configured to cause the processor of the wireless communication device to perform operations further comprising creating the neighbor cell data-base for the modem stack associated with the first SIM by:
  identifying a set of neighbor cells for the modem stack associated with the first SIM based on system information received from the first network;
  periodically measuring signal properties on a downlink carrier frequency for each neighbor cell; and
  storing in the neighbor cell database information identifying each neighbor cell with corresponding recent signal measurements.

26. The non-transitory processor-readable storage medium of claim 22, wherein the stored processor-executable instructions are configured to cause the processor of the wireless communication device to perform operations further comprising:
  identifying one or more transmit chain used for the communication activity on the modem stack associated with the second SIM based on a radio access technology and current serving cell of the modem stack associated with the second SIM;
  identifying any unused transmit chains of the RF resource;
  identifying uplink frequencies supported by any unused transmit chains by accessing configurations stored on the wireless communication device; and
  using identified uplink frequencies to identify downlink frequencies supported by at least one unused receive chain.

27. The non-transitory processor-readable storage medium of claim 22, wherein the stored processor-executable instructions are configured to cause the processor of the wireless communication device to perform operations such that detecting the start of a communication activity on the modem stack associated with the second SIM comprises detecting the start of a voice call on the modem stack associated with the second SIM.

28. The non-transitory processor-readable storage medium of claim 22, wherein the stored processor-executable instructions are configured to cause the processor of the wireless communication device to perform operations such that:
  detecting the start of a communication activity on the modem stack associated with the second SIM comprises detecting the modem stack associated with the second SIM tuning to a second network supported by the second SIM for longer than a threshold time duration,
  wherein the connection to the first network on the modem stack associated with the first SIM is an active data session.

29. The non-transitory processor-readable storage medium of claim 22, wherein the stored processor-executable instructions are configured to cause the processor of the wireless communication device to perform operations further comprising:
  determining whether multiple neighbor cell carrier frequencies are within a downlink frequency range supported by at least one unused receive chain of the RF resource; and selecting, from among the multiple neighbor cell carrier frequencies, a target cell having a highest signal strength in response to determining that multiple neighbor cell carrier frequencies are within the downlink frequency range supported by the at least one unused receive chain, wherein attempting to camp the first SIM on the identified neighbor cell comprises attempting to camp the first SIM on the target cell.

30. The non-transitory processor-readable storage medium of claim 29, wherein the stored processor-executable instructions are configured to cause the processor of the wireless communication device to perform operations further comprising:

determining whether attempting to camp the first SIM on the target cell was successful; and in response to determining that attempting to camp the first SIM on the target cell was not successful:

selecting, from among remaining neighbor cell carrier frequencies, a target cell having a next highest signal strength; and repeating attempting to camp the first SIM on the selected target cell.

\* \* \* \* \*